(12) United States Patent
Fukuta et al.

(10) Patent No.: US 7,742,856 B2
(45) Date of Patent: Jun. 22, 2010

(54) VEHICLE COMMUNICATION METHOD AND SYSTEM, FUNCTION IDENTIFYING SYSTEM, AND ELECTRONIC CONTROL UNIT

(75) Inventors: Kenji Fukuta, Kariya (JP); Seiya Nakayama, Chiryu (JP)

(73) Assignee: Denso Corporation, Kariya (JP)

( * ) Notice: Subject to any disclaimer, the term of this patent is extended or adjusted under 35 U.S.C. 154(b) by 991 days.

(21) Appl. No.: 11/498,862

(22) Filed: Aug. 4, 2006

(65) Prior Publication Data

US 2007/0030844 A1    Feb. 8, 2007

(30) Foreign Application Priority Data

Aug. 4, 2005  (JP) .............................. 2005-226881

(51) Int. Cl.
G01M 17/00 (2006.01)
(52) U.S. Cl. .............................. 701/32; 701/29; 701/33; 701/36
(58) Field of Classification Search .................. 701/29, 701/32, 33, 36, 48, 54; 180/271
See application file for complete search history.

(56) References Cited

U.S. PATENT DOCUMENTS 6,360,152 B1 *   3/2002   Ishibashi et al. ............... 701/48

FOREIGN PATENT DOCUMENTS

| DE | 199 63 210 | 7/2001 |
|---|---|---|
| DE | 100 29 645 | 1/2002 |
| EP | 1039725 A2 | 9/2000 |
| JP | 2000-244549 | 9/2000 |
| JP | 2003-260991 | 9/2003 |
| JP | 2004-020461 | 1/2004 |
| WO | WO 02/37923 | 5/2002 |

OTHER PUBLICATIONS

German Office Action dated Feb. 23, 2009, issued in corresponding German Application No. 10 2006 036 322.1-32, with English translation.

* cited by examiner

*Primary Examiner*—Gertrude Arthur Jeanglaud
(74) *Attorney, Agent, or Firm*—Nixon & Vanderhye P.C.

(57) ABSTRACT

In a vehicle communication system, a first identifier is uniquely assigned to at least one function for vehicle control, the at least one function is installed in at least one of a plurality of control units. An identifying unit identifies that a target function uniquely assigned with a target identifier is installed in which of the control units based on the first identifier and the target identifier.

24 Claims, 11 Drawing Sheets

VEHICLE COMMUNICATION METHOD AND SYSTEM, FUNCTION IDENTIFYING SYSTEM, AND ELECTRONIC CONTROL UNIT

CROSS REFERENCE TO RELATED APPLICATIONS

This application is based on Japanese Patent Application 2005-226881 filed on Aug. 4, 2005. This application claims the benefit of priority from the Japanese Patent Application, so that the descriptions of which are all incorporated herein by reference.

FIELD OF THE INVENTION

The present invention relates to vehicle communication methods and systems including a plurality of control units installed in a vehicle and an in-vehicle communication network that communicably links the plurality of control units to each other. More particularly, the present invention relates to such vehicle communication methods and systems, which are designed such that diagnosis monitoring devices are communicably linkable to the in-vehicle communication network.

BACKGROUND OF THE INVENTION

Conventional vehicle communication systems, in order to send a message to a control unit, are designed to attach, to the message to be sent, an address identifying the control unit.

In addition, in vehicle diagnosis monitoring, an operator communicably connects, to an in-vehicle communication network, a diagnosis monitoring device, such as a diagnosis monitoring tool. Next, the operator operates an enter key and the like of the diagnosis monitoring device to enter, into the diagnosis monitoring device, information indicative of a control unit (target control unit) in which a target function is installed beforehand and of descriptions associated with diagnosis monitoring of the target function. The descriptions are to instruct the target control unit what the operator wants to monitor and diagnose regarding the target function.

In response to the information entry, the diagnosis monitoring device sends, to the target control unit, request messages identifying the target control device as its destination and requesting it to execute diagnosis monitoring of the target function in accordance with the descriptions.

Note that the request messages for diagnosis monitoring include a data request message that requests a target control unit to execute a function of returning control data stored therein and/or a drive request message that requests a target control unit to execute a function of forcibly driving an actuator. The actuator is configured to put in-vehicle devices into automatic action, such as force or motion.

Techniques associated with routers that connect a plurality of different networks to each other are disclosed in European Unexamined Patent Publication No. EP1039725A2 corresponding Japanese Unexamined Patent Publication No. 2000-244549.

In the conventional vehicle diagnosis monitoring set forth above, an operator to manipulate the diagnosis monitoring device, in other words, an operator to perform vehicle diagnosis monitoring needs to previously grasp which functions are installed in advance in which of the control units. This may cause the diagnosis monitoring work to become complicated.

Specifically, hardware standardization among communication systems installed in vehicles is being promoted, which produces an improvement in the portability of applications to realize various types of functions.

For these reasons, even if the functions are the same as each other, they may be installed in different control units depending on the vehicle models. In addition, even if vehicles have the same model, depending on their different grades and/or their different options, they may have different functions installed therein and/or may have different numbers of functions installed therein.

SUMMARY OF THE INVENTION

In view of the background, an object of an aspect of the present invention is to allow diagnosis monitoring of a target function even though an operator to perform vehicle diagnosis monitoring cannot grasp in advance which functions are installed in which control units.

According to one aspect of the present invention, there is provided a vehicle communication system in which a plurality of control units are communicably linked to a communication network, and a monitoring device is designed to communicably linkable to the communication network and to establish communications with at least one of the plurality of control units for monitoring. The vehicle communication system includes a first identifier uniquely assigned to at least one function for vehicle control. The at least one function is installed in at least one of the plurality of control units. The vehicle communication system also includes an identifying unit configured to identify that a target function uniquely assigned with a target identifier is installed in which of the control units based on the first identifier and the target identifier.

According to another aspect of the present invention, there is provided an electronic control unit installed in a vehicle and designed to control the vehicle. The control unit is communicably linked to a communication network installed in the vehicle and communicably linkable through the communication network to a monitoring device designed to establish communications with at least one of the plurality of control units for monitoring. The electronic control unit includes at least one function for vehicle control uniquely assigned with an identifier and installed therein. The electronic control unit also includes a receiving unit configured to receive a request message sent from the monitoring device. The request message contains the identifier of a target function and descriptions used to monitor the target function. The electronic control unit includes a determining unit configured to determine whether the target function whose identifier is contained in the request message is installed therein. The electronic control unit includes an executing unit configured to execute the target function based on the descriptions corresponding thereto when it is determined that the target function whose identifier is contained in the request message is installed therein.

According to another aspect of the present invention, there is provided a system including a monitoring unit and a plurality of executing units in at least one of which a plurality of functions to be executed thereby are installed. The plurality of executing units are communicably linked to a communication network. The monitoring device is designed to establish communications with the plurality of executing units for monitoring. The system includes a first identifier uniquely assigned to each of the plurality of functions, and a second identifier uniquely assigned to each of the plurality of control units. The system also includes an identifying unit configured to identify that a target function uniquely assigned with a target identifier is installed in which of the control units based on a relationship between the first identifier, the second identifier, and the target identifier.

According to a further aspect of the present invention, there is provided a vehicle communication method between a plurality of control units and a monitoring device. The plurality of control units are communicably linked to a communication network. The monitoring device is designed to communicably linkable to the communication network and to establish communications with at least one of the plurality of control units for monitoring. The vehicle communication method includes providing a first identifier uniquely assigned to at least one function for vehicle control, the at least one function being installed in at least one of the plurality of control units; and identifying that a target function uniquely assigned with a target identifier is installed in which of the control units based on the first identifier and the target identifier.

BRIEF DESCRIPTION OF THE DRAWINGS

Other objects and aspects of the invention will become apparent from the following description of embodiments with reference to the accompanying drawings in which.

DETAILED DESCRIPTION OF EMBODIMENTS OF THE INVENTION

Embodiments of the present invention will be described hereinafter with reference to the accompanying drawings. In each embodiment, a vehicle communication system to which the present invention is applied will be described hereinafter. Note that, in each embodiment, a plurality of electronic control units installed in a vehicle (target vehicle) will be referred to as "ECUs", and a diagnosis monitoring device disposed outside of the vehicle will be referred to as "an external tool".

First Embodiment

Figure 1:
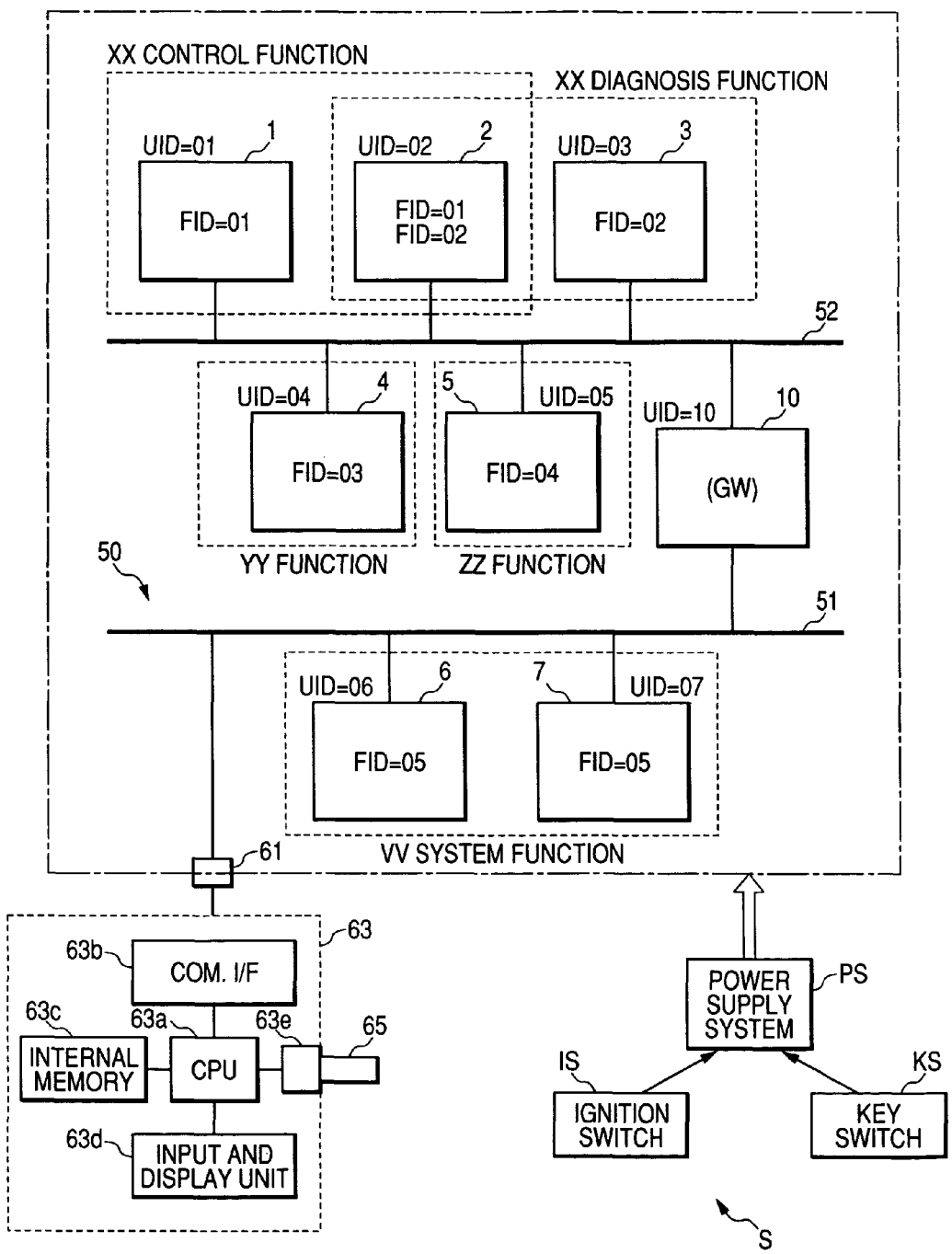
FIG. 1 is a block diagram schematically illustrating an example of the configuration of a vehicle communication system according to a first embodiment of the present invention.

Referring to FIG. 1, a vehicle communication system S installed in the target vehicle according to a first embodiment of the present invention includes a number of, such as eight, ECUs 1 to 7 and 10. In addition, the vehicle communication system S includes an in-vehicle communication network 50 that allows the ECUs 1 to 7 and 10 to communicate with each other. The communication network 50 is designed such that an external tool 63 is removably linked thereto via a connector 61. The external tool 63 is operative to establish a connection to each ECU via the communication network 50 and to communicate with each ECU for diagnosis monitoring.

Specifically, the communication network 50 according to the first embodiment is composed of a first communication bus 51 and a second communication bus 52 whose level is lower by one level than that of the first communication bus 51. For example, the first communication bus 51 has the highest level in the communication network 50. The first and second communication buses 51 and 52 are linked to each other through a gateway (G/W) to form a two-level hierarchical structure.

The five ECUs 1 to 5 and the ECU 10 are communicably coupled to the second communication bus 52, and the two ECUs 6 and 7 and the ECU 10 are communicably coupled to the first communication bus 51. The ECU 10 serves as the gateway operative to interconnect the first and second communication buses 51 and 52 and to route communication data (messages) therebetween. In the first embodiment, the ECU 10 is for example designed specially for gateway.

Note that, in the specification, a message is a unit of data to be sent between a plurality of computing units, such as the ECUs and the external tool 63.

In the first embodiment, each of the ECUs is preferably composed of a computer unit composed of at least a CPU, a memory installed with programs causing the CPU to execute tasks, a communication interface, and an input/output (I/O) interface. The communication interface allows the CPU to communicate with another ECU linked to the communication network 50 therethrough. The input/output (I/O) interface allows the CPU to perform control operations associated with a target device installed in the vehicle.

A plurality of functions for vehicle control, such as engine control function and air-conditioner control function are installed in advance in at least some of the ECUs (e.g. the memories thereof. The plurality of functions can be installed in at least some of the ECUs in various data formats, such as program file formats.

The at least some of the ECUs are programmed to perform the corresponding functions installed therein to control the vehicle.

A unique identifier has been statically set to each function since vehicle development time; this unique identifier, referred to as FID hereinafter, is indicative of each corresponding function.

Similarly, a unique identifier has been statically set to each ECU since the vehicle development time; this unique identifier, referred to as UID hereinafter, is indicative of each corresponding ECU.

In the first embodiment, as illustrated in FIG. 1, as the UIDs, ID numbers identical to the corresponding reference numerals assigned to the ECUs 1 to 7 and 10 have been set thereto. For example, an ID number 01 has been set as its UID to the ECU 1, and an ID number 10 has been set as its UID to the ECU 10.

In the first embodiment, a first function (XX control function) assigned with an FID equal to 01 is installed beforehand in each of the ECUs 1 and 2. Similarly, a second function (XX diagnosis function) to which an FID equal to 02 has been assigned is installed beforehand in each of the ECUs 1 to 3.

In addition, a third function (YY function) assigned with an FID equal to 03 is installed beforehand in the ECU 4. A fourth function (ZZ control function) to which an FID equal to 04 has been assigned is installed in advance in the ECU 5. A fifth function (VV system function) assigned with an FID equal to 05 is installed beforehand in each of the ECUs 6 and 7.

As illustrated in FIG. 1, the external tool 63 is composed of a CPU 63*a*, a communication interface (I/F) 63*b*, an internal memory 63*c*, a card interface (I/F) 63*d*, and an input and display unit 63*e*. For example, the elements 63*a* to 63*e* of the external tool 63 operate by an internal battery (not shown).

The CPU 63*a* is electrically connected to the elements 63*b* to 63*e*. The CPU 63*a* is operative to communicate various types of items of data with each of the elements 63*b* to 63*e* and to perform operations based on the items of data.

The communication I/F 63*b* is designed to be connected to the connector 61, which establishes electrical connection between the communication network 50 and the CPU 63*a* through the connector 61.

The internal memory 63*c* includes, for example, a read only memory (ROM), a random access memory (RAM), or a flash memory in which communication programs and data used upon execution of them are stored in advance. Especially, in the first embodiment, at least one of the communication programs causes the CPU 63*a* to execute access control processing using the data; this access control processing will be described hereinafter (see FIG. 2 hereinafter).

The card I/F 63*d* allows a memory card 65 to removably plug thereinto. The memory card 65 uses a rewritable memory, such as a nonvolatile memory, to store data that can be accessible and rewritable by the CPU 63*a*.

Note that, as the memory card 65, other types of removably memories can be used. For example, disc memories or USB removable memories can be used in place of the memory card 65.

The input and display unit 63*e* has a display for displaying data sent from the CPU 63*a* in a visible format, and has a keyboard or a data entry screen on the display; this keyboard or data entry screen allows an operator to enter data into the CPU 63*a*.

Figures 2, 3:
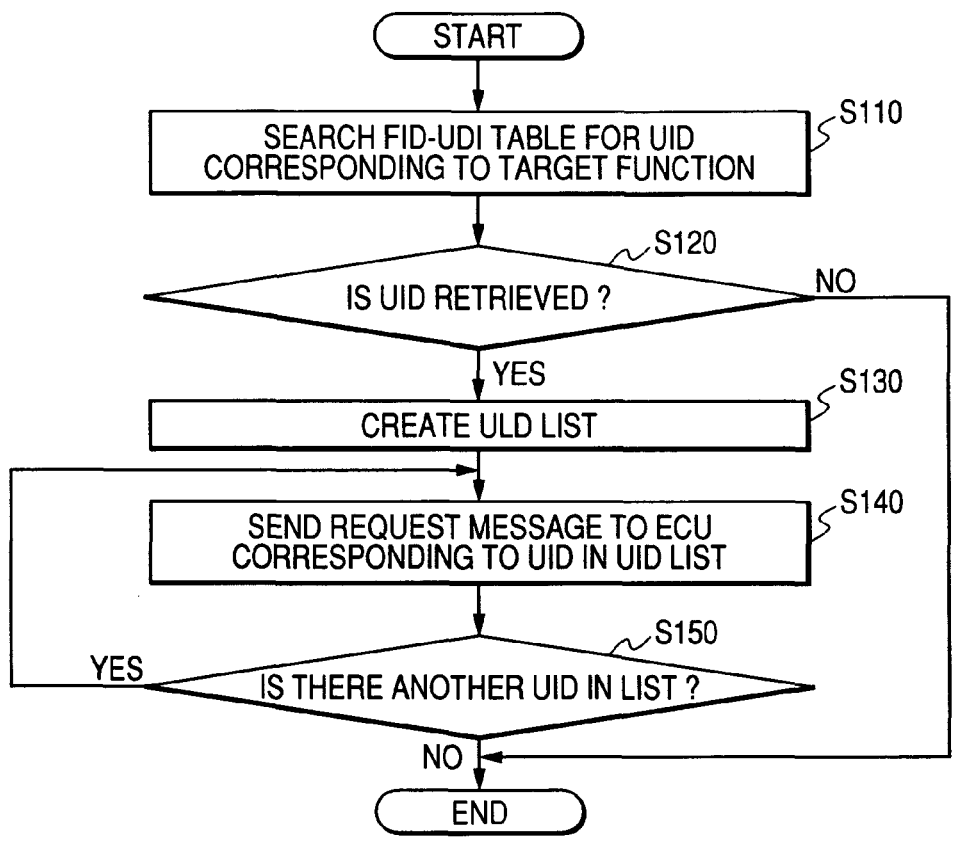
FIG. 2 is a flowchart schematically illustrating an access control processing to be executed by an external tool illustrated in FIG. 1.
FIG. 3 is a view schematically illustrating an example of the configuration of a data table according to the first embodiment.

As illustrated in FIG. 3, the memory card 65 stores in advance a data table T in which the relationship between the FIDs of the first to fifth functions and the UIDs of the ECUs 1 to 7 and 10 are recorded in advance. The data table will be referred to as "FID-UID table" hereinafter.

Specifically, the FID-UID table T can represent that each function is installed in advance in what UID of ECUs. More simply, the FID-UID table T can represent which functions are installed in advance in which of the ECUs.

Note that such a FID-UID table T has been provided for individual vehicles that include different combinations of the functions and the ECUs, and the FID-UID tables provided for the individual vehicles are stored in advance in different memory cards 65.

In addition, each of the ECUs of the vehicle communication system S operates on power supplied from a power supply system PS installed in the vehicle.

In the first embodiment and the other embodiments described hereinafter, the power supply system preferably starts to supply power to each of the ECUs in response to an activate signal being input thereto.

For example, as the activate signal, an ignition switch signal can be used. The ignition switch signal represents the timing when an ignition switch IS of the vehicle is turned on by, for example, the location of an ignition key of the vehicle being inserted in a key cylinder thereof to the ignition position from the off position by the vehicle's driver.

In addition, as the activate signal, a key switch signal can be used. The key switch signal represents the timing when a key switch KS is turned on in response to insertion of the ignition key into the key cylinder by the driver.

Next, the access control processing to be executed by the CPU 63*a* of the external tool 63 upon access thereof to each of the ECUs 1 to 7 and 10 linked to the communication network 50 will be described hereinafter with reference to a flowchart illustrated in FIG. 2.

At first, an operator to perform vehicle diagnosis monitoring selects any one of the memory cards 65 provided for individual vehicles; this selected memory card 65 corresponds to the target vehicle in which the vehicle communication system S is installed in advance. Next, the operator installs the selected memory card 65 into the external tool 63 such that the memory card 65 plugs into the card I/F 63*d*, which allows the CPU 63*a* to access the memory card 65.

Subsequently, the operator manipulates the keyboard or the data entry screen of the input and display unit 63*e* to enter an FID corresponding to at least one of the functions as a target for diagnosis monitoring. In addition to the FID entry, the operator manipulates the keyboard or the data entry screen of the input and display unit 63*e* to enter descriptions that are to instruct a corresponding ECU on what the operator wants to monitor and diagnose regarding the target function.

Upon entry of the FID and the descriptions of the diagnosis monitoring, the CPU 63*a* starts to execute the access control processing illustrated in FIG. 2. Upon entry of the descriptions of the diagnosis monitoring, the CPU 63a can automatically determine an FID of at least one function that meets the entered descriptions.

As illustrated in FIG. 2, when starting the access control processing, the CPU 63a accesses the memory card 65 to read the FID-UID table T therefrom, and searches the read FID-UID table T for UIDs corresponding to the entered FID of the target function in step S110.

Next, the CPU 63a determines whether the UIDs corresponding to the entered FID have been retrieved in step S110 based on the searched result in step S120.

If it is determined that there are no UIDs in the read FID-UID table T (the determination in step S120 is NO), the CPU 63a exits the access control processing.

Otherwise if it is determined that the UIDs corresponding to the entered FID have been retrieved in step S110 (the determination in step S120 is YES), the CPU 63a proceeds to step S130. In step S130, the CPU 63a creates a list of the retrieved UIDs.

Next, in step S140, the CPU 63a creates a request message identifying, as its destination, one ECU shown in the created list and requesting it to execute fault diagnosis in accordance with the entered descriptions, thereby sending the created request message to the communication network 50. Thereafter, in step S140, the CPU 63a deletes the UID corresponding to the ECU identified as the destination of the request message from the list.

Note that messages to be communicated between the external tool 63 and the ECUs or between one ECU and another include at least a data field and a header field preceding it. To the header field of the message, destination thereof is normally arranged.

In case of such a request message, the UID itself corresponding to the ECU identified as the destination can be arranged to the header field, or another data indicative of an ECU identified as the destination can also be arranged to the header field.

In the latter case, it is preferably to convert the UID indicative of an ECU identified as the destination into destination data, and to arrange the converted destination data to the header field of the request message.

In addition, note that the request messages for diagnosis monitoring include a data acquisition request message that requests an ECU identified as its destination to execute a function of:

acquiring control data that has been stored therein and specified in the descriptions of the data acquisition request message; and returning the acquired control data to the external tool 63.

The request messages for diagnosis monitoring also include an actuator drive request message that requests an ECU identified as its destination to execute a function of forcibly driving an actuator that is a control target of the ECU and has been specified in the descriptions in data acquisition request message.

In step S150, the CPU 63a determines whether there is another UID in the list.

If it is determined there are no UIDs in the list (the determination in step S150 is NO), the CPU 63a exits the access control processing.

Otherwise if it is determined that there is at least one UID in the list (the determination in step S150 is YES), the CPU 63a returns to step S140 and repeatedly performs the tasks in steps S140 and S150 unless the determination in step S150 is YES.

As described above, in the access control processing illustrated in FIG. 2, the CPU 63a of the external tool 63 is programmed to:

search the read FID-UID table T for UIDs corresponding to the entered FID of the target function (see step S110); and send the request message to each of the ECUs that correspond to the retrieved UIDs, respectively (see steps S120 to S150).

Specifically, according to the first embodiment, even if an operator to perform diagnosis monitoring of the target vehicle has no grasp where the target function is installed in the ECUs, the task in step S110 by the CPU 63a allows automatic identification of at least one ECU in which the target function is installed in advance. The tasks in steps S130 to 150 therefore permit the request message for diagnosis monitoring to be sent to all of the identified ECUs.

This makes it possible for the operator to perform diagnosis monitoring of the target function without grasping which functions are installed in advance in which of the ECUs.

In addition, each of the memory cards 65 store in advance a FID-UID table; these FID-UID tables have been provided for individual vehicles including respectively different combinations of the functions and the ECUs.

For this reason, replacement of one memory card 65 to be attached to the external tool 63 with a new memory card 65 can support for different vehicles having different models, different grads and/or different options.

Second Embodiment

A vehicle communication system according to a second embodiment of the present invention will be described hereinafter. As compared to the structure of the vehicle communication system S according to the first embodiment, the vehicle communication system according to the second embodiment is specially configured such that the external tool 63 automatically generates the FID-UID table T based on items of information sent from each ECU. For this reason, the memory card 65 need not necessarily be removable from the external tool 63.

Each of the ECUs 1 to 7 and 10 stores therein beforehand the corresponding UID and the FID of corresponding at least one of the functions installed therein.

Except for the different points set forth above, the vehicle communication system of the second embodiment has substantially the same structure as that of the vehicle communication system of the first embodiment. For this reason, like reference characters are assigned to like parts in the vehicle communication systems according to the first and second embodiments so that descriptions of the parts of the vehicle communication system of the second embodiment will be omitted.

Figure 4:
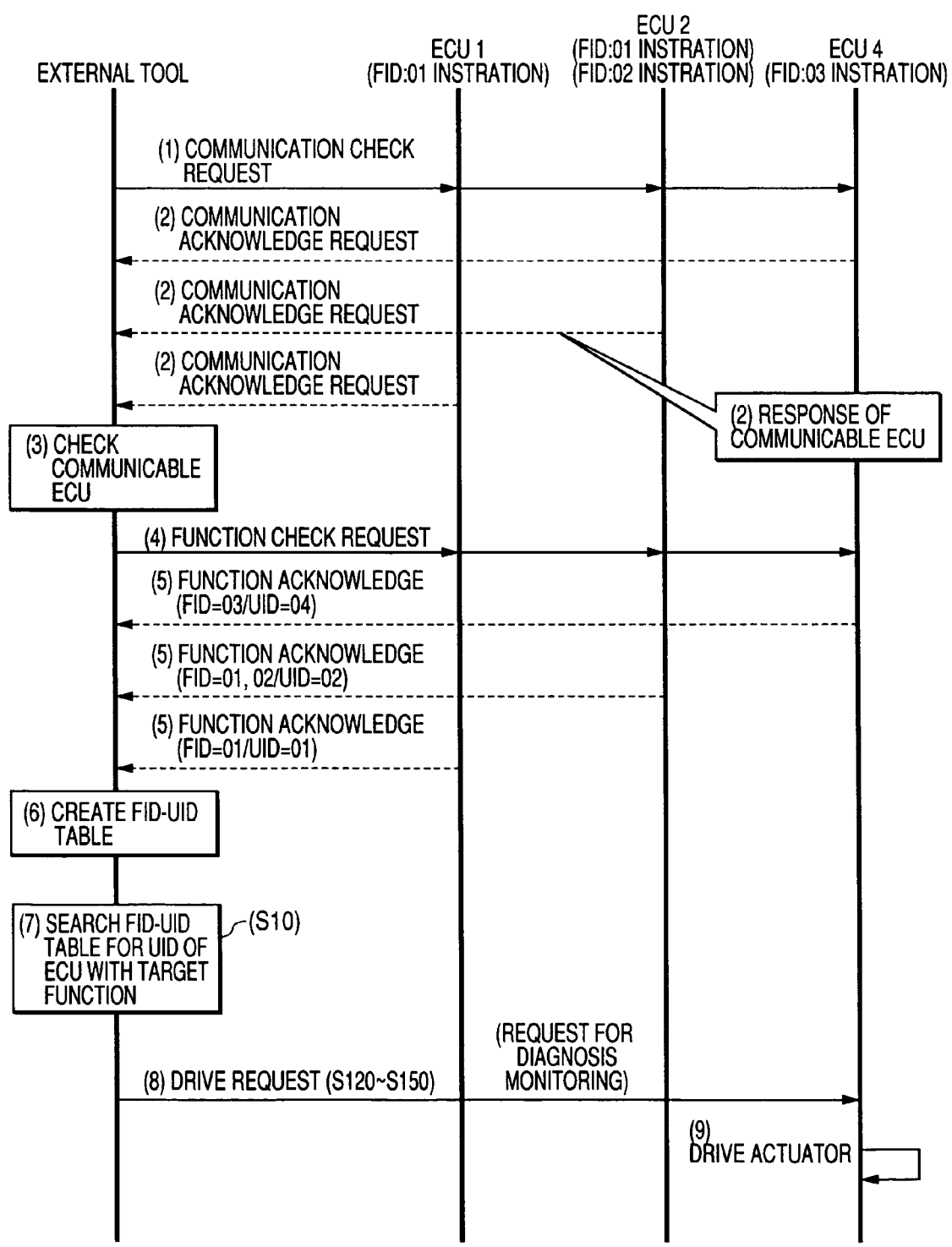
FIG. 4 is a sequence diagram schematically illustrating the sequence of actions to be executed by the external tool and each ECU and of communications sent therebetween according to a second embodiment of the present invention.

Next, operations of the vehicle communication system according to the second embodiment will be described hereinafter with reference to FIG. 4. FIG. 4 is a sequence diagram schematically illustrating the sequence of actions to be executed by the external tool 63 and each ECU and of communications sent therebetween. In the second embodiment, the actions and the communications are required to perform diagnosis monitoring processing according to the second embodiment.

While electrical connection between the communication network 50 and the external tool 63 is established, the CPU 63a of the external tool 63 initiates the diagnosis monitoring processing at power-up or at throwing of its activation switch, thereby broadcasting, to all of the ECUs, a request message to check whether an ECU is communicable (see (1) in FIG. 4).

The request message to check whether an ECU is communicable will be referred to as "communication check request message" hereinafter.

The communication check request message is a message with its header field to which destination information is arranged; this destination information represents all of the ECUs as the destination for the corresponding message. In other words, the destination information represents an indefinite number of the ECUs as the destination for the corresponding message. That is, the communication check request message is a message to be broadcasted on the communication network 50.

When receiving the communication check request message, at least one ECU communicable with the external tool 63 and linked to the communication network 50 returns a communication acknowledge message containing its own UID to the external tool 63 (see (2) in FIG. 4).

The CPU 63*a* of the external tool 63 determines whether to receive communication acknowledge messages within a predetermined period after broadcasting the communication check request message (see (3) in FIG. 4). In other words, the CPU 63*a* determines whether communication acknowledge messages have been sent from the ECUs.

If it is determined that no communication acknowledge messages have been received within the predetermined period, the CPU 63*a* for example exits the diagnosis monitoring processing.

Otherwise if it is determined that a communication acknowledge message have been received from, for example, each ECU within the predetermined period, the CPU 63*a* stores in, for example, the memory card 65 as a communicable ECU. Specifically, the CPU 63*a* stores in the internal memory 63*c* UIDs contained in the communication acknowledge messages returned from the ECUs as UIDs of communicable ECUs, respectively (see (3) in FIG. 4).

After checking of the communicable ECUs, an operator manipulates the keyboard or the data entry screen of the input and display unit 63*e* of the external tool 63 to enter an FID corresponding to at least one of the functions as a target for diagnosis monitoring. In addition to the FID entry, the operator manipulates the keyboard or the data entry screen of the input and display unit 63*e* to enter descriptions that are to instruct a corresponding ECU on what the operator wants to monitor and diagnose regarding the target function.

Upon entry of the FID and the descriptions of the diagnosis monitoring, the CPU 63*a* of the external tool 63 creates a function check request message inquiring, to each of the ECUs corresponding to the UIDs stored in the memory card 65 by the action (3) in FIG. 4, which functions are installed therein (see (4) in FIG. 4).

When receiving the function check request message, each of the ECUs corresponding to the UIDs stored in the memory card 65 by the action (3) in FIG. 4 creates a function acknowledge message that contains its own UID and at least one FID corresponding to at least one function installed therein. Thereafter, each of the ECUs sends the created function acknowledge message to the external tool 63 (see (5) in FIG. 4).

For example, because the ECU 4 has installed the third function (YY function) assigned with the FID 03, the function acknowledge message that contains its own UID (04) and the FID (03) corresponding to the third function installed therein is sent from the ECU 4 to the external tool 63 (see (5) in FIG. 4).

Similarly, because the ECU 2 has installed the first and second functions (XX control function and XX diagnosis function) respectively assigned with the FIDs 01 and 02, the function acknowledge message that contains its own UID (02) and the FIDs (01 and 02) corresponding to the first and second functions installed therein is sent from the ECU 2 to the external tool 63 (see (5) in FIG. 4).

The CPU 63*a* of the external tool 63 receives the function acknowledge messages sent from the communicable ECUs, creates an FID-UID table T illustrated in, for example, FIG. 3 based on the received function acknowledge messages, and thereafter, stores the created FID-UID table T in the internal memory 63*c* (see (6) in FIG. 4).

As well as the first embodiment, the FID-UID table T is designed to represent each function is installed in advance in what UID of the communicable ECUs. More simply, the FID-UID table T is designed to represent which functions are installed in advance in which communicable ECUs.

The CPU 63*a* of the external tool 63 reads the FID-UID table T from the internal memory 63*c*, and searches the read FID-UID table T for UIDs corresponding to the entered FID of the target function, which is similar to step S110 (see (7) in FIG. 4).

Thereafter, the CPU 63*a* of the external tool 63 executes the same tasks in step S120 to S150 in FIG. 2, thereby sending the request message to the ECUs corresponding to the UIDs retrieved in the action (7) in FIG. 4; this request message requests the ECUs to execute fault diagnosis in accordance with the entered descriptions that are to instruct the ECUs on what the operator wants to monitor and diagnose regarding the target function.

Note that, in the second embodiment, as the request message sent from the external tool 63 to the ECU 4 by the action (8) in FIG. 4, a drive request message that requests the ECU 4 to execute a function of forcibly driving an actuator that is a control target of the ECU 4 is illustrated by an example.

Specifically, upon receipt of the drive request message, the ECU 4 executes a function (target function) of forcibly driving the actuator; this function is identified by the drive request message, which causes the actuator to put in-vehicle devices into automatic action, such as force or motion (see (9) in FIG. 4). The operator therefore can monitor and diagnose the operating state of each of the in-vehicle devices to determine whether the target function (actuator driving function) is normal or abnormal based on the monitored and diagnosed result.

As set forth above, the vehicle communication system according to the second embodiment can obtain the following effects in addition to allowing the operator to perform diagnosis monitoring of the target function without grasping which functions are installed in advance in which of the ECUs. That is, it is unnecessary to install beforehand an FID-UID table in the external tool 63 and to provide FID-UID tables for individual vehicles including respectively different combinations of the functions and the ECUs.

Specifically, it is possible to eliminate the necessity to manually manage FID-UID tables, thereby improving the enhance of operators in diagnosis monitoring of the functions installed in the ECUs linked to the communication network 50.

In addition, the actions (1) to (3) in FIG. 4 allow the external tool 63 not to send the function acknowledge message to ECUs that are difficult to communicate with the external tool 63, making it possible to reduce the communication load on the communication network 50.

Note that the actions (1) to (3) in FIG. 4 can be executed after the operator enters a communication check instruction to the CPU 63*a* of the external tool 63 by manipulating the input and display unit 63*e*. In addition, note that the actions (1) to (3) in FIG. 4 can be carried out, before sending of the function check request message, in response to entry of an FID corresponding to at least one of the functions as a target for diagnosis monitoring and descriptions representing what the operator wants to monitor and diagnose regarding the target function.

Third Embodiment

A vehicle communication system according to a third embodiment of the present invention will be described hereinafter. As compared to the structure of the vehicle communication system according to each of the first and second embodiments, the vehicle communication system according to the third embodiment is specially configured such that the external tool 63 identifies at least one ECU in which a target function is installed without using an FID-UID table. In the FID-UID table, the relationship between the FIDs of all of functions and the UIDs of all of the ECUs are recorded in advance.

Specifically, the vehicle communication system according to the third embodiment is specially configured such that the external tool 63 identifies at least one ECU to which the request message should be sent without using the FID-UID table.

As with the second embodiment, each of the ECUs 1 to 7 and 10 stores therein beforehand the corresponding UID and the FID of corresponding at least one of the functions installed therein.

Except for the different points set forth above, the vehicle communication system of the third embodiment has substantially the same structure as that of the vehicle communication system of the first embodiment. For this reason, like reference characters are assigned to like parts in the vehicle communication systems according to the first and third embodiments so that descriptions of the parts of the vehicle communication system of the third embodiment will be omitted.

Figure 5:
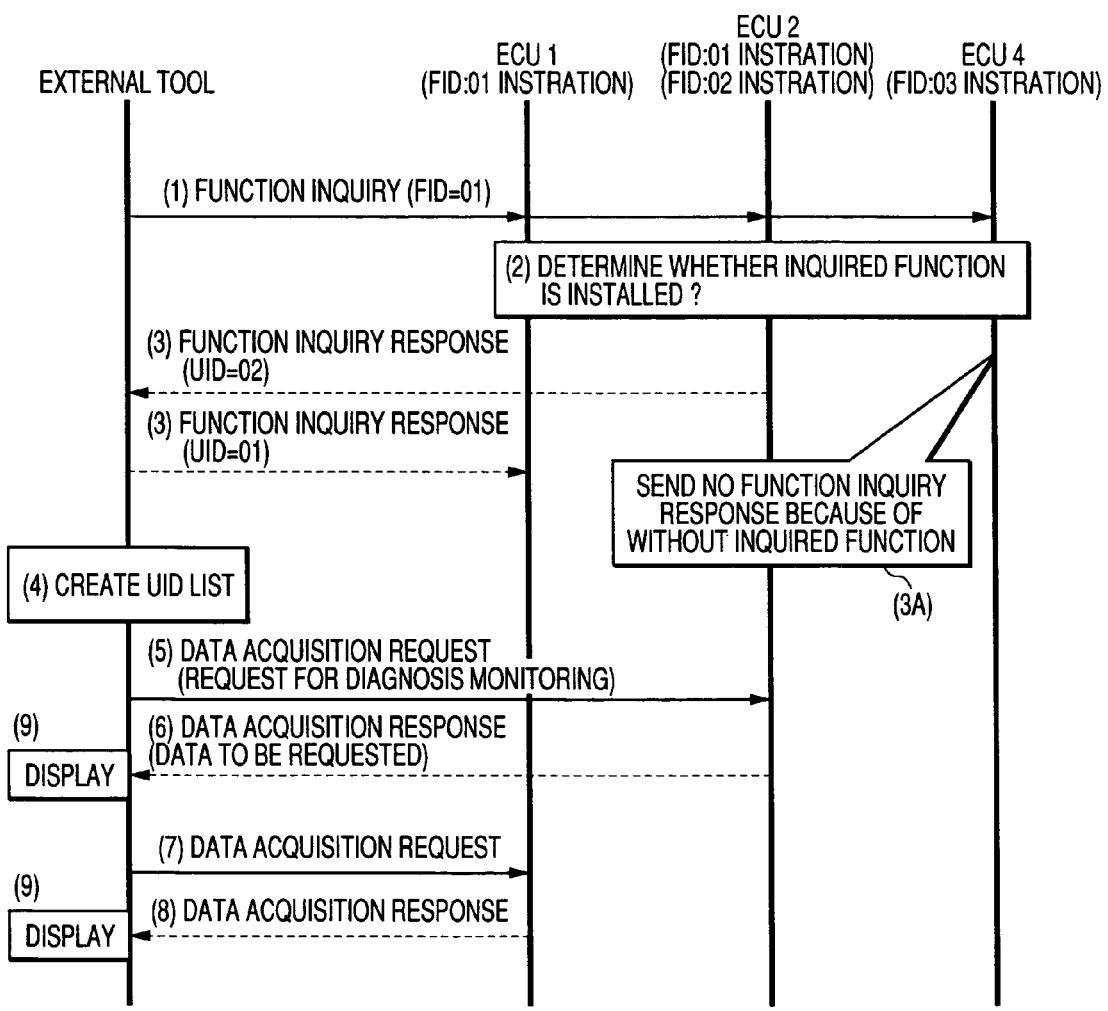
FIG. 5 is a sequence diagram schematically illustrating the sequence of actions to be executed by the external tool and each ECU and of communications sent therebetween according to a third embodiment of the present invention.

Next, operations of the vehicle communication system according to the third embodiment will be described hereinafter with reference to FIG. 5. FIG. 5 is a sequence diagram schematically illustrating the sequence of actions to be executed by the external tool 63 and each ECU and of communications sent therebetween. In the third embodiment, the actions and the communications are required to perform diagnosis monitoring processing according to the third embodiment.

While electrical connection between the communication network 50 and the external tool 63 through the connector 61 is established, an operator manipulates the keyboard or the data entry screen of the input and display unit 63e of the external tool 63 to enter an FID corresponding to at least one of the functions as a target for diagnosis monitoring.

In addition to the FID entry, the operator manipulates the keyboard or the data entry screen of the input and display unit 63e to enter descriptions that are to instruct a corresponding ECU on what the operator wants to monitor and diagnose regarding the target function.

Upon entry of the FID and the descriptions of the diagnosis monitoring, the CPU 63a of the external tool 63 creates a function inquiry message containing the FID corresponding to the target function and inquiring, to all of the ECUs linked to the communication network 50, whether the target function is installed therein. Then, the CPU 63a sends the created function inquiry message to all of the ECUs (see (1) in FIG. 5).

When receiving the function inquiry message, each of the ECUs determines whether the function corresponding to the FID contained in the function inquiry message is installed therein (see (2) in FIG. 5).

In the third embodiment, for example, the function inquiry message containing the FID (01) corresponding to the first function (target function) is sent from the external tool 63 to all of the ECUs 1 to 7 and 10.

Because each of the ECUs 1 and 2 has installed the first function corresponding to the FID (01), each of the ECUs 1 and 2 creates a function inquiry response message containing its own UID, thereby sending it to the external tool 63 (see (3) in FIG. 5).

In contrast, because the remaining ECUs 3 to 7 and 10 have not installed the first function corresponding to the FID (01), the remaining ECUs 3 to 7 and 10 send no function inquiry response message to the external tool 63 (see (3A) in FIG. 5).

The CPU 63a of the external tool 63 receives the function inquiry response messages sent from the ECUs 1 and 2, and creates a list of the UIDs contained respectively in the received function inquiry response messages, which is the same task as that in step S130 of FIG. 2 (see (4) in FIG. 5). Specifically, the created list recites at least one ECU in which the target function is installed.

Then, the CPU 63a of the external tool 63 executes the same tasks in step S140 and S150 in FIG. 2, and thereafter sends the request message to the ECUs corresponding to the UIDs recited in the list created by the action (4) in FIG. 5 (see (5) and (7) in FIG. 5). The request message sent from the CPU 63a requests the ECUs to execute fault diagnosis in accordance with the entered descriptions that are to instruct the ECUs on what the operator wants to monitor and diagnose regarding the target function.

Note that, in the third embodiment, as the request message sent from the external tool 63 by the action (5) in FIG. 5, a data acquisition request message is illustrated by an example. The data acquisition request message requests an ECU identified as its destination to execute a function of acquiring control data that has been stored therein and specified in the descriptions of the data acquisition request message, and returning the acquired control data to the external tool 63.

Specifically, as illustrated by the action (5) in FIG. 5, when the data acquisition request message is sent from the external tool 63 to, for example, the ECU 2, the ECU 2 executes a data acquisition function (the target function) of:

acquiring control data that has been stored therein and specified in the descriptions of the data acquisition request message;

creating, as the function inquiry response message, a data acquisition response message with the data field to which the acquired control data is arranged; and returning the created data acquisition response message to the external tool 63 (see (6) in FIG. 5).

Moreover, as illustrated by the action (7) in FIG. 5, when the data acquisition request message is sent from the external tool 63 to, for example, the ECU 1, the ECU 1 executes a data acquisition function (the target function) of:

acquiring control data that has been stored therein and specified in the descriptions of the data acquisition request message;

creating, as the function inquiry response message, a data acquisition response message with the data field to which the acquired control data is arranged; and returning the created data acquisition response message to the external tool 63.

The CPU 63a of the external tool 63 receives the data acquisition response messages sent from the ECUs 1 and 2, and displays, on the input and display unit 63e, the items of control data contained in the received data acquisition response messages in a visible format (see (9) in FIG. 5).

The operator therefore can monitor and diagnose contents and/or values of the items of control data displayed on the input and display unit 63e to determine whether the target function (data acquisition function) is normal or abnormal based on the monitored and diagnosed result.

Specifically, the external tool 63 according to the third embodiment is configured to:

send, to all of the ECUs, the function inquiry request message containing an FID corresponding to a target function; and identify that at least one ECU corresponding to an UID contained in the function inquiry response message sent from at least one ECU is an ECU in which the target function is installed.

As set forth above, in the vehicle communication system according to the third embodiment, in addition to the effects obtained by the second embodiment, it is unnecessary for the external tool 63 to create and hold an FID-UID table in which the relationship between the FIDs of all of the functions and the UIDs of all of the ECUs are recorded in advance. This makes it possible to reduce the processing load required to create the FID-UID table and the storage capacity in the internal memory 63c required to store the FID-UID table.

Fourth Embodiment

A vehicle communication system SA according to a fourth embodiment of the present invention will be described hereinafter. As compared to the structure of the vehicle communication system according to the first embodiment, the external tool 63 and the ECUs of the vehicle communication system according to the fourth embodiment are similarly configured to execute the actions illustrated by (1) to (8) in FIG. 5.

Specially, in the fourth embodiment, a communication network 50A is designed to form a three-level hierarchical structure. In addition, in the fourth embodiment, the vehicle communication system SA includes a number of, such as twelve ECUs 1 to 8, 10, 20, 30, and 40. Each of the ECUs 1 to 8, 10, 20, 30, and 40 is operative to additionally execute the tasks (A) to (D) described hereinafter.

Figure 6:
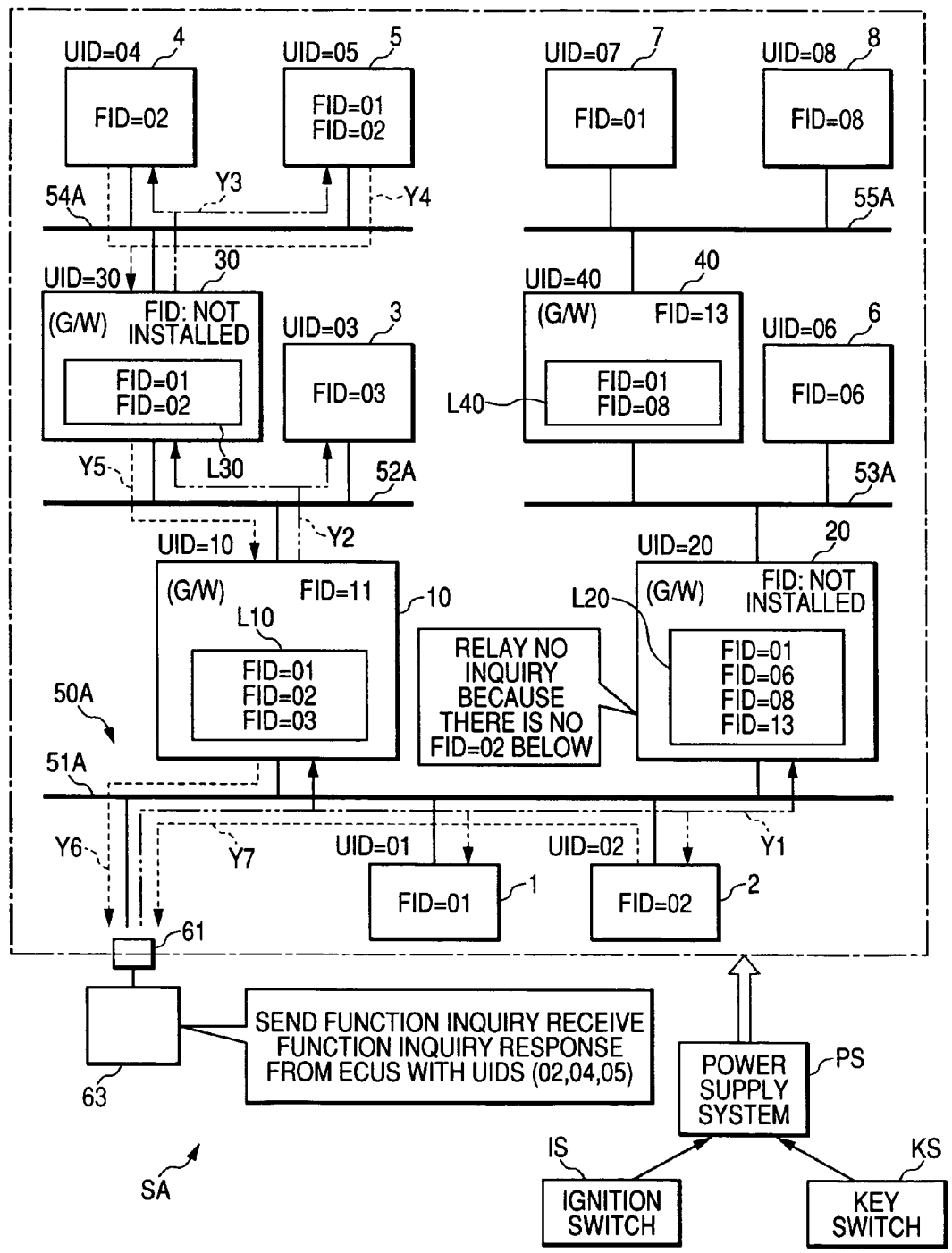
FIG. 6 is a block diagram schematically illustrating an example of the configuration of a vehicle communication system according to a fourth embodiment of the present invention.

As illustrated in FIG. 6, the communication network 50A is composed of a first communication bus 51A, a pair of second communication buses 52A and 53A whose levels are lower by one level than that of the first communication bus 51A, and a pair of third communication buses 54A and 55A whose levels are lower by one level than those of the second communication buses 52A and 53A.

The first communication bus 51A is configured to be communicably linkable to an external tool 63A via a connector 61.

The ECUs 1, 2, 10, and 20 are communicably coupled to the first communication bus 51A, the ECUs 3, 10, and 30 are communicably coupled to the second communication bus 52A, and the ECUs 6, 20, and 40 are communicably coupled to the second communication bus 53A. The ECUs 4, 5, and 30 are communicably coupled to the third communication bus 54A, and the ECUs 7, 8, and 40 are communicably coupled to the third communication bus 55A.

Specifically, the first communication bus 51A and the second communication bus 52A are linked to each other through the ECU 10 that serves as a gateway operative to interconnect the first and second communication buses 51A and 52A and to route communication data (messages) therebetween.

The first communication bus 51A and the second communication bus 53A are linked to each other through the ECU 20 that serves as a gateway operative to interconnect the first and second communication buses 51A and 53A and to route communication data (messages) therebetween.

The second communication bus 52A and the third communication bus 54A are linked to each other through the ECU 30 that serves as a gateway operative to interconnect the second and third communication buses 52A and 54A and to route communication data (messages) therebetween.

The second communication bus 53A and the third communication bus 55A are linked to each other through the ECU 40 that serves as a gateway operative to interconnect the second and third communication buses 53A and 55A and to route communication data (messages) therebetween.

In the fourth embodiment, each of the ECUs 20 and 30 is for example designed specially for gateway, but the ECUs 10 and 40 are also operative to execute vehicle control like each of the ECUs 1 to 8. Note that, in case of distinguishing between the ECUs 10, 20, 30, and 40 and the ECUs 1 to 8, the ECUs 10, 20, 30, and 40 serving as a gateway will be collectively referred to gateway ECUs, and the remaining ECUs 1 to 8 will be collectively referred to as non-gateway ECUs hereinafter.

In the fourth embodiment, as well as the first to third embodiments, as unique identifiers (UIDs), ID numbers identical to the corresponding reference numerals assigned to the ECUs 1 to 8, 10, 20, 30, and 40 have been set thereto. For example, an ID number 01 has been set as its UID to the ECU 1, an ID number 10 has been set as its UID to the ECU 10, and an ID number 30 has been set as its UID to the ECU 30.

In the fourth embodiment, a first function assigned with an FID equal to 01 is installed beforehand in each of the ECUs 1, 5, 7, 10, 20, 30, and 40, and a second function to which an FID equal to 02 has been assigned is installed beforehand in each of the ECUs 2, 4, 5, 10, and 30. Similarly, a third function assigned with an FID equal to 03 is installed beforehand in each of the ECUs 3 and 10, and a fourth function assigned with an FID equal to 04 is installed beforehand in the ECU 4.

A sixth function to which an FID equal to 06 has been assigned is installed beforehand in each of the ECUs 6 and 20, and an eighth function assigned with an FID equal to 08 is installed beforehand in each of the ECUs 8, 10, and 40. An eleventh function to which an FID equal to 11 has been assigned is installed beforehand in the ECU 10, and a thirteenth function assigned with an FID equal to 13 is installed beforehand in each of the ECUs 20 and 40.

Each of the ECUs 1 to 8, 10, 20, 30, and 40 stores therein beforehand the corresponding UID and the FID of corresponding at least one of the functions installed therein.

Except for the different points set forth above, the vehicle communication system SA of the fourth embodiment has substantially the same structure as that of the vehicle communication system of the first embodiment. For this reason, like reference characters are assigned to like parts in the vehicle communication systems according to the first and fourth embodiments so that descriptions of the parts of the vehicle communication system of the fourth embodiment will be omitted.

Next, operations of the vehicle communication system SA according to the fourth embodiment will be described hereinafter with reference to FIGS. 7A to 7D.

Figure 7A:
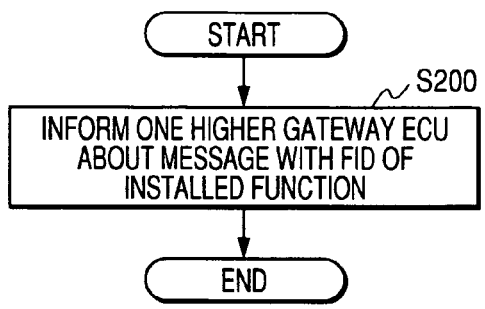
FIG. 7A is a flowchart schematically illustrating operations to be executed by a non-gate way ECU illustrated in FIG. 6.

When a power supply from the power supply system PS is started to the ECUs, each of the non-gateway ECUs 3 to 8 linked to the second and third communication buses 52A to 55A lower by one level than the first communication bus 51A executes the task (A) in step S200 of FIG. 7A.

Specifically, in step S200, each non-gateway ECU informs one gateway ECU about a message containing the FID of at least one function installed therein; this gateway ECU is intermediate between the corresponding second or third communication bus linked to each non-gateway ECU and another communication bus whose level is higher by one level than that of the corresponding second or third communication bus.

For example, in step S200, the non-gateway ECU 5 informs the gateway ECU 30 about a message containing the FIDs (01 and 02), and the non-gateway ECU 6 informs the gateway ECU 20 about a message containing the FID (06).

Note that, in the fourth embodiment and the other embodiments described hereinafter, the power supply system PS starts to supply power to each of the ECUs in response to an activate signal being input thereto.

For example, as the activate signal, an ignition switch signal can be used. The ignition switch signal represents the timing when an ignition switch of the vehicle is turned on by, for example, the location of an ignition key of the vehicle being inserted in a key cylinder thereof to the ignition position from the off position by the vehicle's driver.

In addition, as the activate signal, a key switch signal can be used. The key switch signal represents the timing when a key switch is turned on in response to insertion of the ignition key into the key cylinder by the driver.

Figure 7B:
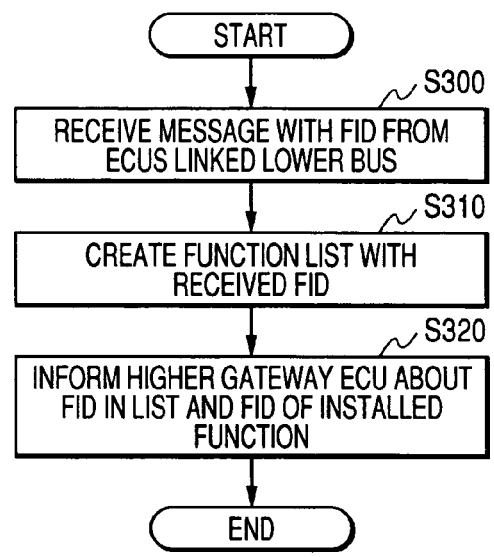
FIG. 7B is a flowchart schematically illustrating operations to be executed by a gate way ECU illustrated in FIG. 6.

When the power supply system PS starts to supply power to the ECUs in response to an activate signal, such as the ignition switch signal or the key switch signal, being input thereto, each of the gateway ECUs 30 and 40 except for the gateway ECUs 10 and 20 executes the task (B) in steps S300 to S320 of FIG. 7B.

In step S300, each of the gateway ECUs 30 and 40 receives the message containing the FIDs informed from at least one of the gateway and non-gateway ECUs linked to the corresponding third communication bus 54A or 55A. The third communication bus 54A or 55A linked to each of the gateway ECUs 30 and 40 is lower by one level than the second communication bus 52A or 53A linked thereto.

Next, in step S310, the gateway ECUs 30 and 40 create function lists L30 and L40 in which the received FIDs are recorded, respectively.

Subsequently, the gateway ECUs 30 and 40 inform the higher gateway ECUs, such as ECUs 10 and 20, about a message containing the FIDs recorded in the created lists L30 and L40, respectively; these higher gateway ECUs are higher by one level than the gateway ECUs 30 and 40, respectively in step S320.

In step S320, in addition to the FIDs recorded in the created lists L30 and L40, the gateway ECUs 30 and 40 inform the higher gateway ECUs about a message containing the FID at least one function installed therein.

Specifically, an FID informed from a non-gateway ECU to a gateway ECU is used to create a function list by the gateway ECU. In addition, an FID informed from a gateway ECU to another gateway ECU higher by one level than the gateway ECU is used to crease a function list by the higher gateway ECU.

Figure 7C:
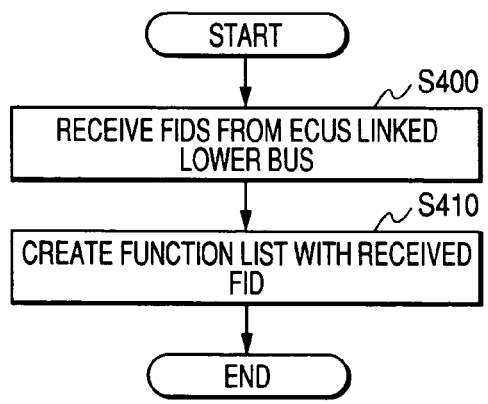
FIG. 7C is a flowchart schematically illustrating operations to be executed by a gate way ECU higher in level than that the gateway ECU associated with the operations illustrated in FIG. 7B.

When the power supply system PS starts to supply power to the ECUs in response to an activate signal, such as an ignition switch signal or key switch signal, being input thereto, each of the gateway ECUs 10 and 20 linked to the top-level communication bus 51A executes the task (C) in steps S400 and S410 of FIG. 7C.

In step S400, each of the gateway ECUs 10 and 20 receives the FIDs informed from at least one of the gateway and non-gateway ECUs linked to the corresponding second communication bus 52A or 53A. The second communication bus 52A or 53A linked to each of the gateway ECUs 10 and 20 is lower by one level than the first communication bus 51A linked thereto.

Next, in step S410, the gateway ECUs 10 and 20 create function lists L10 and L20 in which the received FIDs are recorded, respectively.

Figure 7D:
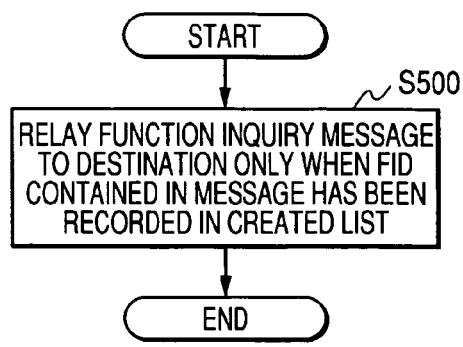
FIG. 7D is a flowchart schematically illustrating operations to be executed by gate way ECUs according to the fourth embodiment.

Moreover, when receiving the function inquiry message sent from the external tool 63, each of the gateway ECUs 10, 20, 30, and 40 executes the task (D) in step S500 of FIG. 7D.

Specifically, each of the gateway ECUs 10, 20, 30, and 40 relays the received function inquiry message to the destination only when at least one FID contained in the function inquiry message has been recorded in the function list created thereby in step S500.

Note that, in the fourth embodiment, each of the gateway ECUs 10, 20, 30, and 40 is configured to execute the actions (2) and (3) illustrated in FIG. 5 like each of the non-gateway ECUs 1 to 8. Specifically, each of the ECUs 10, 20, 30, and 40 determines whether the function corresponding to at least one FID contained in the function inquiry message is installed therein (see (2) in FIG. 5).

If it is determined that each of the ECUs 10, 20, 30, and 40 has installed the function corresponding to at least one FID contained in the function inquiry message, each of the ECUs 10, 20, 30, and 40 creates a function inquiry response message containing its own UID. Then, each of the ECUs 10, 20, 30, and 40 sends the created function inquiry response message to the external tool 63 (see (3) in FIG. 5).

Note that, in the fourth embodiment, messages to be sent to a gateway ECU from an ECU lower than the gateway ECU include at least a header field and a data field. To the header field of the message, identification information representing that this message is a communication message used to create a function list is arranged. The identification information allows the gateway ECU to securely and simply distinguish between messages used to create a function list and normal communication messages.

Next, the tasks (A) to (D) will be described with reference to FIGS. 6 and 7A to 7D.

When the power supply system PS starts to feed power to the ECUs in response to, for example, turning on of the ignition switch IS of the vehicle, the non-gateway ECU 4 executes the task (A) (step S200) to notify the gateway ECU 30 of the message containing the FID (02) of the second function installed therein. Similarly, the non-gateway ECU 5 executes the task (A) to notify the gateway ECU 30 of the message containing the FIDs (01 and 02) of the first and second functions installed therein.

Upon the power supplied to the ECUs, the non-gateway ECU 3 notifies the gateway ECU 10 of the message containing the FID (03) of the third function installed therein. Similarly, the non-gateway ECUs 7 and 8 notify the gateway ECU 40 of the messages containing the FID (01) and the FID (08) of the first and eighth functions installed therein, respectively In response to start of power supply to the ECUs, the non-gateway ECU 6 notifies the gateway ECU 20 of the message containing the FID (06) of the sixth function installed therein.

The gateway ECU 30 executes the task (B) (steps S300 to S320) to;

receive the FIDs (01 and 02) informed from the ECUs 4 and 5 linked to the lower communication bus 54A;

create the function list L30 in which the received FIDs (01 and 02) are recorded; and notify the higher gateway ECU 10 of the message containing the FIDs (01 and 02) recorded in the function list L30 because the gateway ECU 30 includes no functions associated with vehicle control.

The gateway ECU 40 executes the task (B) (steps S300 to S320) to:

receive the FIDs (01 and 08) informed from the ECUs 7 and 8 linked to the lower communication bus 55A;

create the function list L40 in which the received FIDs (01 and 08) are recorded; and notify the higher gateway ECU 20 of the message containing the FIDs (01 and 08) recorded in the function list L30 and the FID (13) of the thirteenth function contained therein.

The gateway ECU 10 executes the task (C) (steps S400 to S410) to:

receive the FIDs (01, 02, and 03) informed from the ECUs 3 and 30 linked to the lower communication bus 52A; and create the function list L10 in which the received FIDs (01, 02, and 03) are recorded.

The gateway ECU 20 executes the task (C) (steps S400 to S410) to:

receive the FIDs (01, 06, 08, and 13) informed from the ECUs 6 and 40 linked to the lower communication bus 53A; and create the function list L20 in which the received FIDs (01, 06, 08, and 13) are recorded.

Thereafter, it is assumed that the CPU 63a of the external tool 63 executes the action (1) in FIG. 5 to send, to each of the ECUs linked to the communication network 50A, the function inquiry message containing the FID (02) of the second function as the target function (see the two-dot chain arrow Y1 in FIG. 6).

In this case, because the FID (02) is recorded beforehand in the function lists L10 and L30 created by the gateway ECUs 10 and 30, the gateway ECUs 10 and 30 execute the task (D) to receive the function inquiry message, thereby relaying the function inquiry message to the ECUs lower in level than the gateway ECUs 10 and 30 (see two-dot chain lines shown by the two-dot chain arrows Y2 and Y3 in FIG. 6).

In contrast, no FID (02) is recorded in each of the function lists L20 and L40 created by the gateway ECUs 20 and 40. For this reason, each of the gateway ECUs 20 and 40 does not relay the function inquiry message to the ECUs lower in level than each of the gateway ECUs 20 and 40. Specifically, in the fourth embodiment, when the external tool 63 sends the function inquiry message containing the FID (02), the function inquiry message is not relayed to the second communication bus 53A and the third communication bus 55A.

Based on the function inquiry message sent to the ECUs 2, 4, and 5, each of the ECUs 2, 4, and 5 sends the function inquiry response message containing its own UID.

As illustrated by the dashed arrow Y7, the function inquiry response message sent from the ECU 2 is transferred via only the communication bus 51A to be received by the external tool 63.

On the other hand, as illustrated by the dashed arrows Y4 to Y7, the function inquiry response messages sent from the ECUs 4 and 5 are transferred via the communication bus 54A, the gateway ECU 30, the communication bus 52A, the gateway ECU 10, and the communication bus 51A to be received by the external tool 63.

As set forth above, in the vehicle communication system SA according to the fourth embodiment, in addition to the effects obtained by the third embodiment, the function inquiry message sent from the external tool 63 can be prevented from being relayed to part of the communication network 50A to which at least one ECU installed with no target functions is only linked. For example, in the case of the function inquiry message with the FID (02), the function inquiry message can be prevented from being relayed to the second communication bus 53A and the third communication bus 55A.

This makes it possible to reduce the communication load via the communication network 50A and the communication processing load of each of the ECUs.

In addition, reduction of the communication load through the communication network 50A also can shorten a period from when the external tool 63 sends the function inquiry message until when it receives the function inquiry response message corresponding to the sent function inquiry message. This makes it possible to reduce the time for the external tool 63 to identify at least one ECU installed with the target function. More specifically, it is possible to reduce the time for the external tool 63 to create the list by executing the action (4) in FIG. 5.

Fifth Embodiment

A vehicle communication system SB according to a fifth embodiment of the present invention will be described hereinafter with reference to FIGS. 8 and 9A to 9D.

As compared to the structure of the vehicle communication system SA according to the fourth embodiment, the vehicle communication system SB of the fifth embodiment has substantially the same structure as that of the vehicle communication system SA of the fourth embodiment. For this reason, like reference characters are assigned to like parts in the vehicle communication systems according to the fourth and fifth embodiments so that descriptions of the parts of the vehicle communication system of the fifth embodiment will be omitted.

Figure 9A:
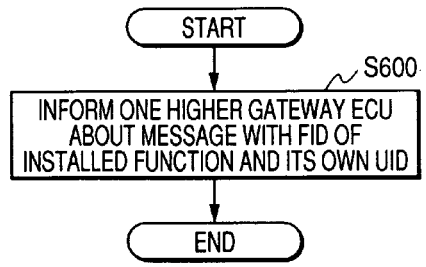
FIG. 9A is a flowchart schematically illustrating operations to be executed by a non-gate way ECU illustrated in FIG. 8.

In the fifth embodiment, each of the ECUs 1 to 8, 10, 20, 30, and 40 is operative to execute the tasks (a) to (d) in place of the tasks (A) to (D):

When power supply system PS starts to supply power to the ECUs in response to an activate signal, such as an ignition switch signal or a key switch signal, being input thereto, each of the non-gateway ECUs 3 to 8 linked to the second and third communication buses 52A to 55A lower than the first communication bus 51A executes the task (a) in step S600 of FIG. 9A.

Specifically, in step S600, each non-gateway ECU informs one gateway ECU about, as data table creating information, a message containing the FID of at least one function installed therein and its own UID. The one gateway ECU is intermediate between the corresponding second or third communication bus linked to each non-gateway ECU and another communication bus whose level is higher by one level than that of the corresponding second or third communication bus.

For example, in step S600, the non-gateway ECU 5 informs the gateway ECU 30 about a message containing the FIDs (01 and 02) and its own UID (05), and the non-gateway ECU 6 informs the gateway ECU 20 about a message containing the FID (06) and its own UID (06).

Figure 9B:
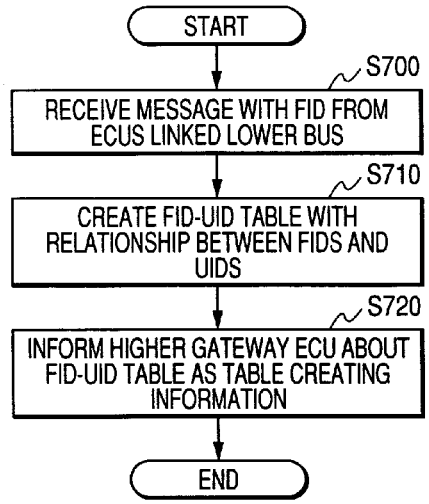
FIG. 9B is a flowchart schematically illustrating operations to be executed by a gate way ECU illustrated in FIG. 8.

When the power supply system PS starts to supply power to each of the ECUs in response to an activate signal, such as an ignition switch signal or a key switch signal being input thereto, each of the gateway ECUs 30 and 40 except for the gateway ECUs 10 and 20 executes the task (b) in steps S700 to S720 of FIG. 9B.

In step S700, each of the gateway ECUs 30 and 40 receives the data table creating information informed from at least one of the gateway and non-gateway ECUs linked to the corresponding third communication bus 54A or 55A. The third communication bus 54A or 55A linked to each of the gateway ECUs 30 and 40 is lower by one level than the second communication bus 52A or 53A linked thereto.

Next, in step S710, the gateway ECUs 30 and 40 create FID-UID tables T30 and T40 based on the received data table creating information, respectively. The FID-UID table T30 has recorded therein the relationship between:

the FID of at least one function installed in at least one of the gateway and non-gateway ECUs linked to the corresponding third communication bus 54A;

the FID of at least one function installed in the gateway ECU 30 where it exists (in the fifth embodiment, no functions are installed in the ECU 30); and the UID of its own gateway ECU 30.

Similarly, the FID-UID table T40 has recorded therein the relationship between:

the FID of at least one function installed in at least one of the gateway and non-gateway ECUs linked to the corresponding third communication bus 55A;

the FID of at least one function installed in the gateway ECU 40 where it exists (in the fifth embodiment, the thirteen function with the FID (13) is installed in the ECU 40); and the UID of its own gateway ECU 40.

Subsequently, in step S720, the gateway ECUs 30 and 40 inform the higher gateway ECUs 10 and 20 about the created FID-UID tables T30 and T40 as data table creating information, respectively.

Figure 9C:
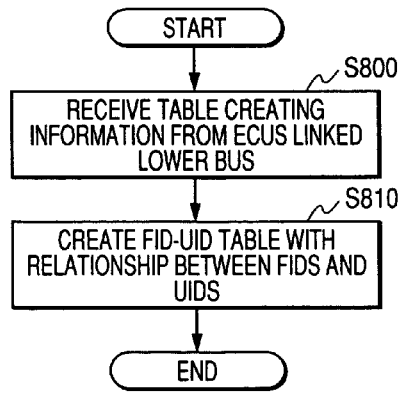
FIG. 9C is a flowchart schematically illustrating operations to be executed by a gate way ECU higher in level than that the gateway ECU associated with the operations illustrated in FIG. 9B.

When the power supply system PS starts to supply power from the power supply system PS in response to an activate signal, such as an ignition switch signal or a key switch signal, each of the gateway ECUs 10 and 20 linked to the top-level communication bus 51A executes the task (c) in steps S800 and S810 of FIG. 9C.

In step S800, each of the gateway ECUs 10 and 20 receives the data table creating information informed from at least one of the gateway and non-gateway ECUs linked to the corresponding second communication bus 52A or 53A. The second communication bus 52A or 53A linked to each of the gateway ECUs 10 and 20 is lower by one level than the first communication bus 51A linked thereto.

Next, in step S810, the gateway ECUs 10 and 20 create FID-UID tables T10 and T20 based on the received data table creating information, respectively. The FID-UID table T10 has recorded therein the relationship between:

the FID of at least one function installed in at least one of the gateway and non-gateway ECUs linked to the corresponding second communication bus 52A;

the FID of at least one function installed in the gateway ECU10 where it exists (in the fifth embodiment, the eleventh function with the FID (13) is installed in the ECU 10); and the UID of its own gateway ECU 10.

Similarly, the FID-UID table T20 has recorded therein the relationship between:

the FID of at least one function installed in at least one of the gateway and non-gateway ECUs linked to the corresponding second communication bus 53A;

the FID of at least one function installed in the gateway ECU 20 where it exists (in the fifth embodiment, no functions are installed in the ECU 20); and the UID of its own gateway ECU 20.

Figure 9D:
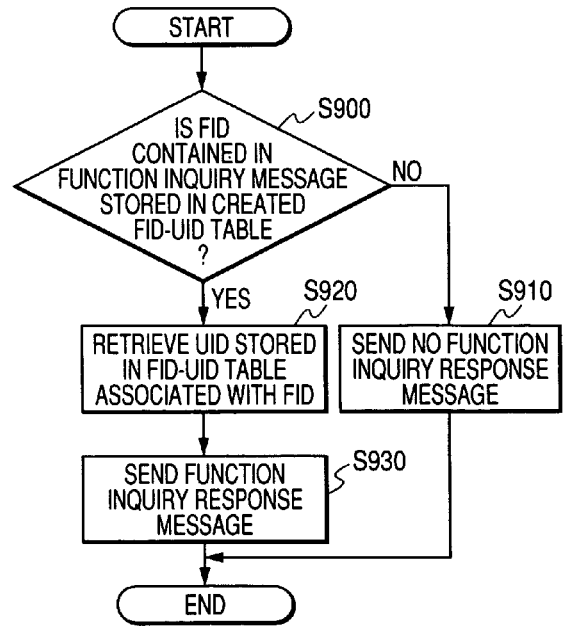
FIG. 9D is a flowchart schematically illustrating operations to be executed by the gate way ECU higher in level than that the gateway ECU associated with the operations illustrated in FIG. 9B.

Moreover, when receiving the function inquiry message sent from the external tool 63, each of the gateway ECUs 10 and 20 executes the task (d) in steps S900 and S930 of FIG. 9D.

Specifically, each of the gateway ECUs 10 and 20 determines whether at least one FID contained in the received function inquiry message is stored in the FID-UID table created thereby in step S900.

If it is determined that at least one FID contained in the received function inquiry message is not stored in the FID-UID table created by each of the ECUs 10 and 20 (the determination in step S900 is NO), no function inquiry response message is sent therefrom to the external tool 63 in step S910, the task (D) is terminated.

Otherwise if it is determined that at least one FID contained in the received function inquiry message is stored in the FID-UID table created by each of the ECUs 10 and 20 (the determination in step S900 is YES), each of the ECUs 10 and 20 goes to step S920. In step S920, each of the ECUs 10 and 20 retrieves at least one UID stored in the corresponding FID-UID table to be associated with the at least one FID.

Then, each of the ECUs 10 and 20 sends a function inquiry response message containing the retrieved at least one UID to the external tool 63 in step S930.

Note that, in the fifth embodiment, messages to be sent, for use in the data table creating information, to a gateway ECU from an ECU lower than the gateway ECU include at least a header field and a data field. To the header field of the message, identification information representing that this message is a communication message used to create an FID-UID table is arranged. The identification information allows the gateway ECU to securely and simply distinguish between messages used to create an FID-UID table and normal communication messages.

Next, the tasks (a) to (d) will be described with reference to FIGS. 8 and 9A to 9D.

When the power supply system PS starts to feed power to the ECUs in response to turning on of, for example, the ignition switch IS of the vehicle, the non-gateway ECU 4 executes the task (a) (step S600). Specifically, the non-gateway ECU 4 notifies the gateway ECU 30 of the message containing the FID (02) of the second function installed therein and its own UID (04). Similarly, the non-gateway ECU 5 executes the task (a) to notify the gateway ECU 30 of the message containing the FIDs (01 and 02) of the first and second functions installed therein and its own UID (05).

Upon the power supplied to the ECUs, the non-gateway ECU 3 notifies the gateway ECU 10 of the message containing the FID (03) of the third function installed therein and its own UID (30). Similarly, the non-gateway ECU 7 notifies the gateway ECU 40 of the message containing the FID (01) of the first function installed therein and its own UID 07. In addition, the non-gateway ECU 8 notifies the gateway ECU 40 of the message containing the FID (08) of the eighth function installed therein and its own UID (08). In response to start of power supply to the ECUs, the non-gateway ECU 6 notifies the gateway ECU 20 of the message containing the FID (06) of the sixth function installed therein and its own UID (06).

Figure 8:
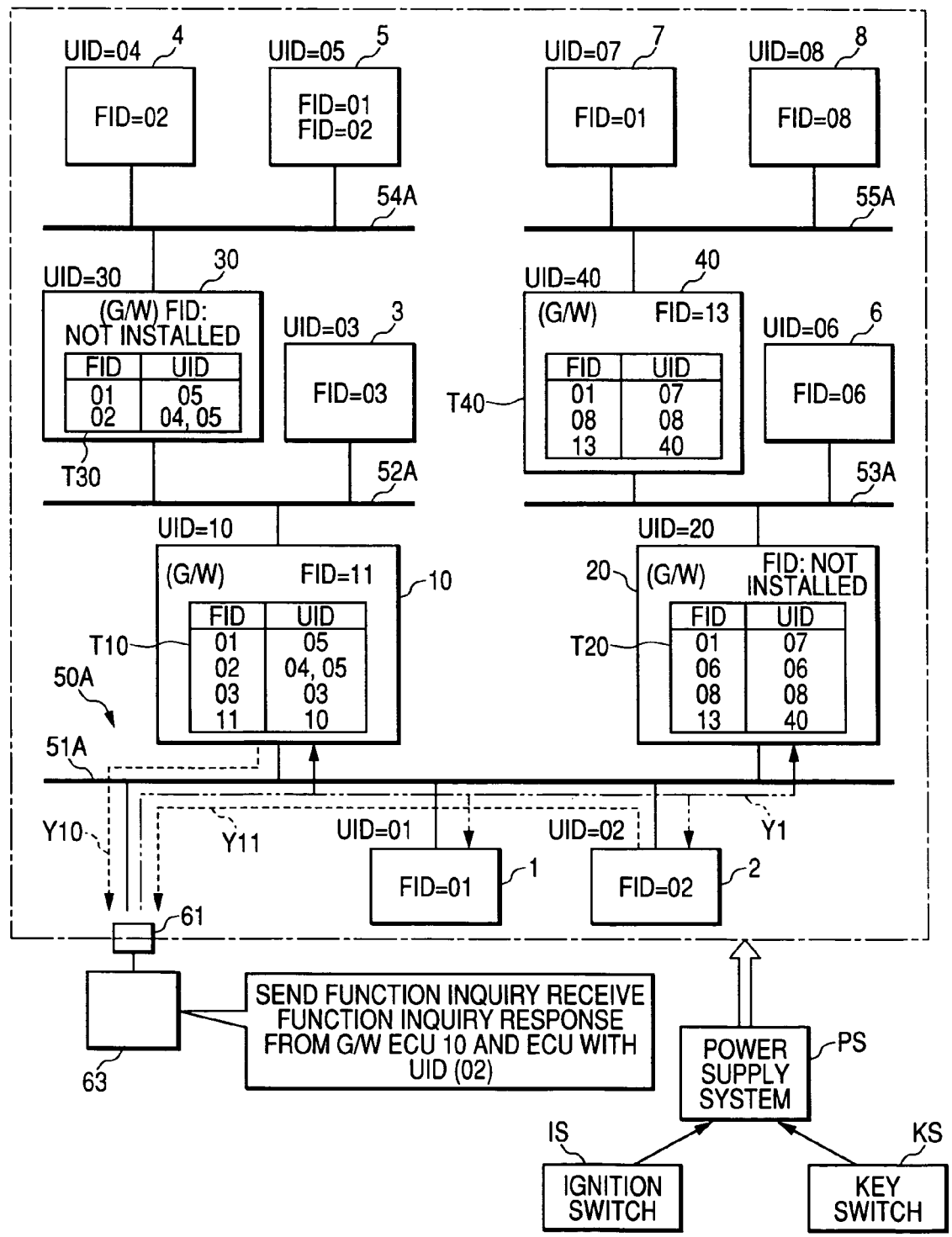
FIG. 8 is a block diagram schematically illustrating an example of the configuration of a vehicle communication system according to a fifth embodiment of the present invention.

The gateway ECU 30 executes the task (b) (steps S700 to S720) to:

receive the FIDs and the UIDs informed from the ECUs 4 and 5 linked to the lower communication bus 54A;

create the FID-UID table T30 illustrated in FIG. 8 based on only the received FIDs and the UIDs because no functions are installed therein; and notify the higher gateway ECU 10 of a message containing information indicative of the contents of the FID-UID table T30.

Specifically, as illustrated in FIG. 8, in the table T30, the FID (01) is recorded to be associated with the UID (05) in which the corresponding first function is installed, and the FID (02) is recorded to be associated with the UIDs (04 and 05) in which the corresponding second function is installed.

Similarly, the gateway ECU 40 executes the task (b) (steps S700 to S720) to:

receive the FIDs and the UIDs informed from the ECUs 7 and 8 linked to the lower communication bus 55A;

create the FID-UID table T40 illustrated in FIG. 8 based on the received FIDs and the UIDs and the FID (13) of the thirteen function installed therein; and notify the higher gateway ECU 20 of a message containing information indicative of the contents of the FID-UID table T40.

Specifically, as illustrated in FIG. 8, in the table T40, the FID (01) is recorded to be associated with the UID (07) in which the corresponding first function is installed, and the FID (08) is recorded to be associated with the UID (08) in which the corresponding eighth function is installed. Similarly, in the table T40, the FID (13) is recorded to be associated with the UID (40) in which the corresponding thirteenth function is installed.

The gateway ECU 10 executes the task (c) (steps S800 to S810) to:

receive the FIDs and UIDs informed from the ECUs 3 and 30 linked to the lower communication bus 52A; and create the FID-UID table T10 based on the received FIDs and UIDs and the FID (11) of the eleventh function installed therein.

Specifically, as illustrated in FIG. 8, in the table T10, the FID (01) is recorded to be associated with the UID (05) in which the corresponding first function is installed, and the FID (02) is recorded to be associated with the UIDs (04 and 05) in which the corresponding second function is installed. In addition, in the table T10, the FID (03) is recorded to be associated with the UID (03) in which the corresponding third function is installed, and the FID (11) is recorded to be associated with the UID (10) in which the corresponding eleventh function is installed.

Similarly, the gateway ECU 20 executes the task (c) (steps S800 to S810) to:

receive the FIDs and UIDs informed from the ECUs 6 and 40 linked to the lower communication bus 53A; and create the FID-UID table T20 based on only the received FIDs and UIDs because no functions are installed therein.

Specifically, as illustrated in FIG. 8, in the table T20, the FID (01) is recorded to be associated with the UID (07) in which the corresponding first function is installed, and the FID (06) is recorded to be associated with the UID (06) in which the corresponding sixth function is installed. In addition, in the table T20, the FID (08) is recorded to be associated with the UID (08) in which the corresponding eighth function is installed, and the FID (13) is recorded to be associated with the UID (40) in which the corresponding thirteenth function is installed.

Thereafter, it is assumed that the CPU 63a of the external tool 63 executes the action (1) in FIG. 5 to send, to each of the ECUs linked to the communication network 50A, the function inquiry message containing the FID (02) of the second function as the target function (see two-dot chain lines shown by the two-dot chain arrow Y1 in FIG. 8).

In this case, because the FID (02) is recorded beforehand in the UID-FID table T10 created by the gateway ECU 10, the gateway ECU 10 executes the task (d) to:

determine that the FID (02) is stored in the FID-UID table T10;

retrieve the UIDs (04 and 05) recorded in the FID-UID table T10 to be associated with the FID (02); and send a function inquiry response message containing the retrieved UIDs (04 and 05) to the external tool 63 (see dashed line shown by the dashed arrow Y10 in FIG. 8).

In contrast, because the FID (02) is not recorded beforehand in the UID-FID table T12 created by the gateway ECU 20, the gateway ECU 20 executes the task (d) to send no function inquiry response message to the external tool 63.

Note that, in the fifth embodiment, based on the function inquiry message sent to the ECU 2, the ECU 2 linked to the first communication bus 51A executes actions (2) and (3) in FIG. 5 to send the function inquiry response message containing its own UID (02) to the external tool 63.

In addition, in the fifth embodiment, because it is unnecessary to relay, to the communication buses lower in level than the first communication bus 51A, function inquiry messages sent from the external tool 63. This allows each of the gateway ECUs 10 and 20 not to relay the function inquiry messages sent from the external tool 63 to the second communication bus 52A or 53A.

As illustrated in FIG. 8, therefore, when the function inquiry message containing the FID (02) is sent from the external tool 63 (illustrated by the two-dot chain arrow Y1), the function inquiry response messages are sent from the ECUs 2 and 10 to the external tool 63 (see the dashed arrows Y10 and Y11 in FIG. 8). Then, after receiving all of the function inquiry response messages sent from the ECUs 2 and 10, the CPU 63a of the external tool 63 creates the list in which the UIDs included in all of the response messages are recited (see (4) in FIG. 5). For example, in the case where the target function is the second function, the UIDs (02, 04, and 05) of the ECUs 2, 4, and 5 in which the second function is installed in advance can be automatically recited in the created list.

As described above, in the vehicle communication system SB according to the fifth embodiment, in addition to the effects obtained by the third embodiment, either the gateway ECU 10 or the gateway ECU 20 linked to the top-level communication bus 51A is configured to respond the function inquiry message sent from the external tool 63 in place of at least one ECU in which the target function is installed beforehand and linked to a communication bath lower in level than the communication bus 51A.

Specifically, at least one ECU in which a target function is installed beforehand and linked to a communication bath lower in level than the communication bus 51A requires no responding a function inquiry message containing the FID of the target function.

This makes it possible to further reduce the communication load via the communication network 50A and the communication processing load of each of the ECUs.

In addition, reduction of the communication load through the communication network 50A also can shorten a period from when the external tool 63 sends the function inquiry message until when it receives the function inquiry response message corresponding to the sent function inquiry message. This makes it possible to further reduce the time for the external tool 63 to identify at least one ECU installed with the target function.

Sixth Embodiment

A vehicle communication system SC according to a sixth embodiment of the present invention will be described hereinafter with reference to FIG. 10.

As compared to the structure of the vehicle communication system SB according to the fifth embodiment, the vehicle communication system according to the sixth embodiment has two different points as follows.

Specifically, as the first different point, the vehicle communication system SC includes an ECU 9 in addition to the ECUs 1 to 8, 10, 20, 30, and 40. The ECU 9 is linked to the first communication bus 51A. In the ECU 9, a ninth function for vehicle control assigned with an FID equal to 09 is installed beforehand. The ECU 9 stores therein beforehand the corresponding UID and the FID (09) of the ninth function. The ECU 9 will be referred to as "master ECU 9" hereinafter.

Figure 10:
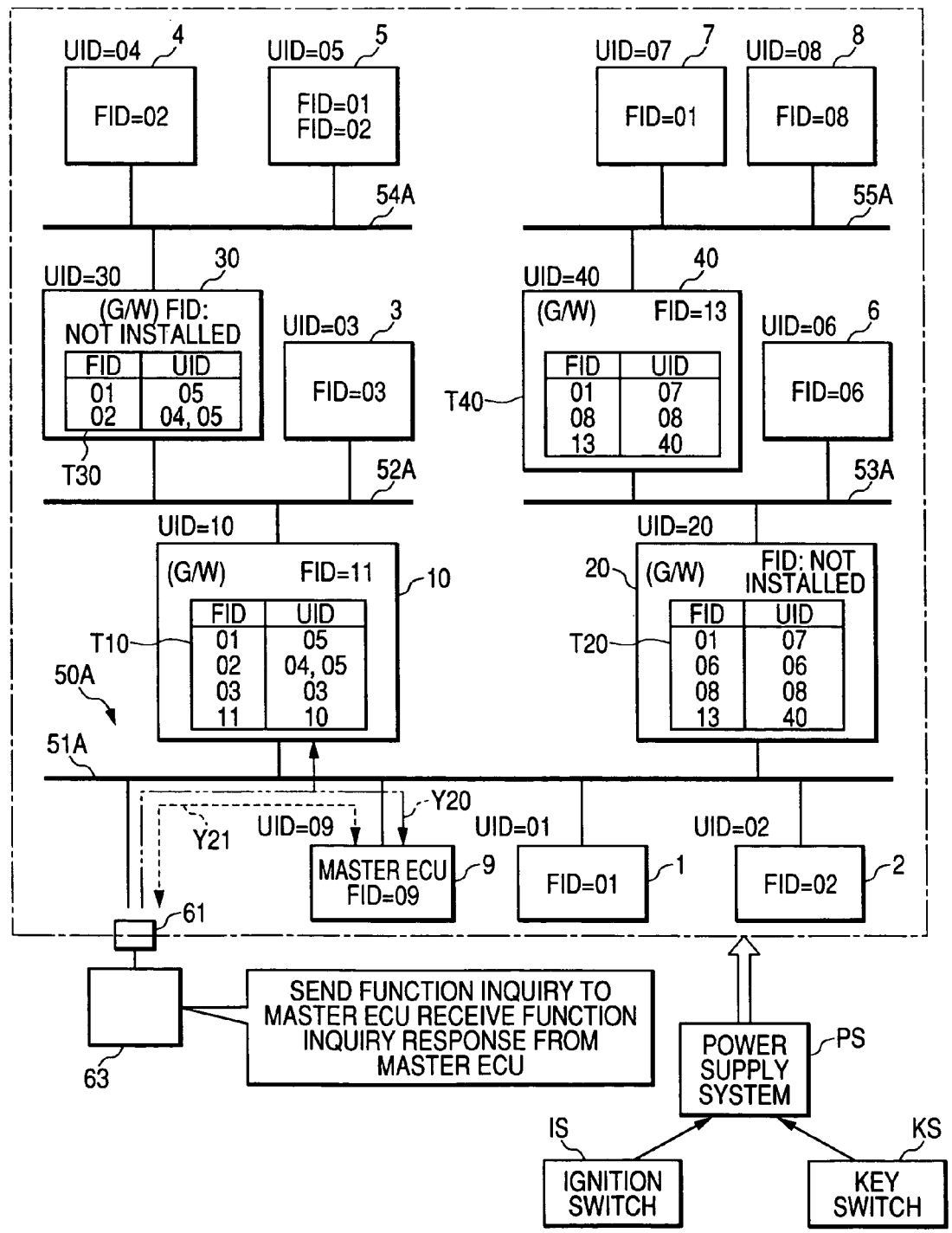
FIG. 10 is a block diagram schematically illustrating an example of the configuration of a vehicle communication system according to a sixth embodiment of the present invention.

As the second different point, the CPU 63a of the external tool 63 is programmed to send a function inquiry message containing the FID of at least one target function to only the master ECU 9 (see the two-dot chain arrow Y20 in FIG. 10).

When receiving the function inquiry message sent from the external tool 63, the master ECU 9 is configured to:

send the received function inquiry message to the remaining ECUs of the system SC, receive a function inquiry response message sent from at least one EC; and send the received function inquiry response message to the external tool 63 (see the dashed arrow Y21 in FIG. 10).

Except for the different points set forth above, the vehicle communication system of the sixth embodiment has substantially the same structure as that of the vehicle communication system of the fifth embodiment. For this reason, like reference characters are assigned to like parts in the vehicle communication systems according to the fifth and sixth embodiments so that descriptions of the parts of the vehicle communication system of the sixth embodiment will be omitted.

According to the configuration of the vehicle communication system SC, when the function inquiry message containing the FID (02) of the second function as the target function is sent from the external tool 63 to the master ECU 9, the master ECU 9 receives the function inquiry message. Next, the master ECU 9 sends the received function inquiry message to each of the ECUs 1, 2, 0, and 20 linked to the first communication bus 51A.

As a result, like the fifth embodiment (see FIG. 8), each of the ECUs 2 and 10 sends the function inquiry response message to the master ECU 9. The master ECU 9 receives the function inquiry response message sent from each of the ECUs 2 and 10, and sends it to the external tool 63.

Specifically, the master ECU 9 according to the sixth embodiment is configured to relay a function inquiry message sent from the external tool 63 to the remaining ECUs, and to relay a function inquiry response message sent from at least one ECU to the external tool 63.

The external tool 63 therefore only communicates with the master ECU 9 in order to identify at least one ECU in which a target function is installed beforehand. This makes it possible to reduce the communication processing load of the external tool 63. In addition, it is unnecessary for the master ECU 9 to have an FID-UID table, making it possible to prevent the resources of the master ECU 9 for use in data storage from increasing.

Note that, in the sixth embodiment, the master ECU 9 can be configured to execute the actions (2) and (3) in FIG. 5 like the remaining ECUs.

Specifically, when a function inquiry message containing the FID (09) of the ninth function as the target function is sent from the external tool 63 to the master ECU 9, the master ECU 9 is configured to:

receive the function inquiry message to send it to each of the ECUs 1, 2, 0, and 20 linked to the first communication bus 51A; and send a function inquiry response message containing its own UID (09) to the external tool 63.

Seventh Embodiment

A vehicle communication system according to a seventh embodiment of the present invention will be described hereinafter. As compared to the structure of the vehicle communication system S according to the first embodiment, the CPU 63a of the external too 63 is specially configured to:

communicate with a specified ECU; and identify, based on the communicated result, at least one ECU in which a target function is installed beforehand, in other words, at least one ECU to which a request message for diagnosis monitoring should be sent. In the seventh embodiment, the memory card 65 need not necessarily be removable from the external tool 63.

Except for the different points set forth above, the vehicle communication system of the seventh embodiment has substantially the same structure as that of the vehicle communication system of the first embodiment. For this reason, like reference characters are assigned to like parts in the vehicle communication systems according to the first and seventh embodiments so that descriptions of the parts of the vehicle communication system of the seventh embodiment will be omitted.

In addition, in the seventh embodiment, like the second to sixth embodiments, each of the ECUs stores therein beforehand its own UID and the FID of at least one function installed therein.

In the seventh embodiment, one of the ECUs, such as the ECU 7 for example, selves as a master ECU as the specified ECU.

Figure 11:
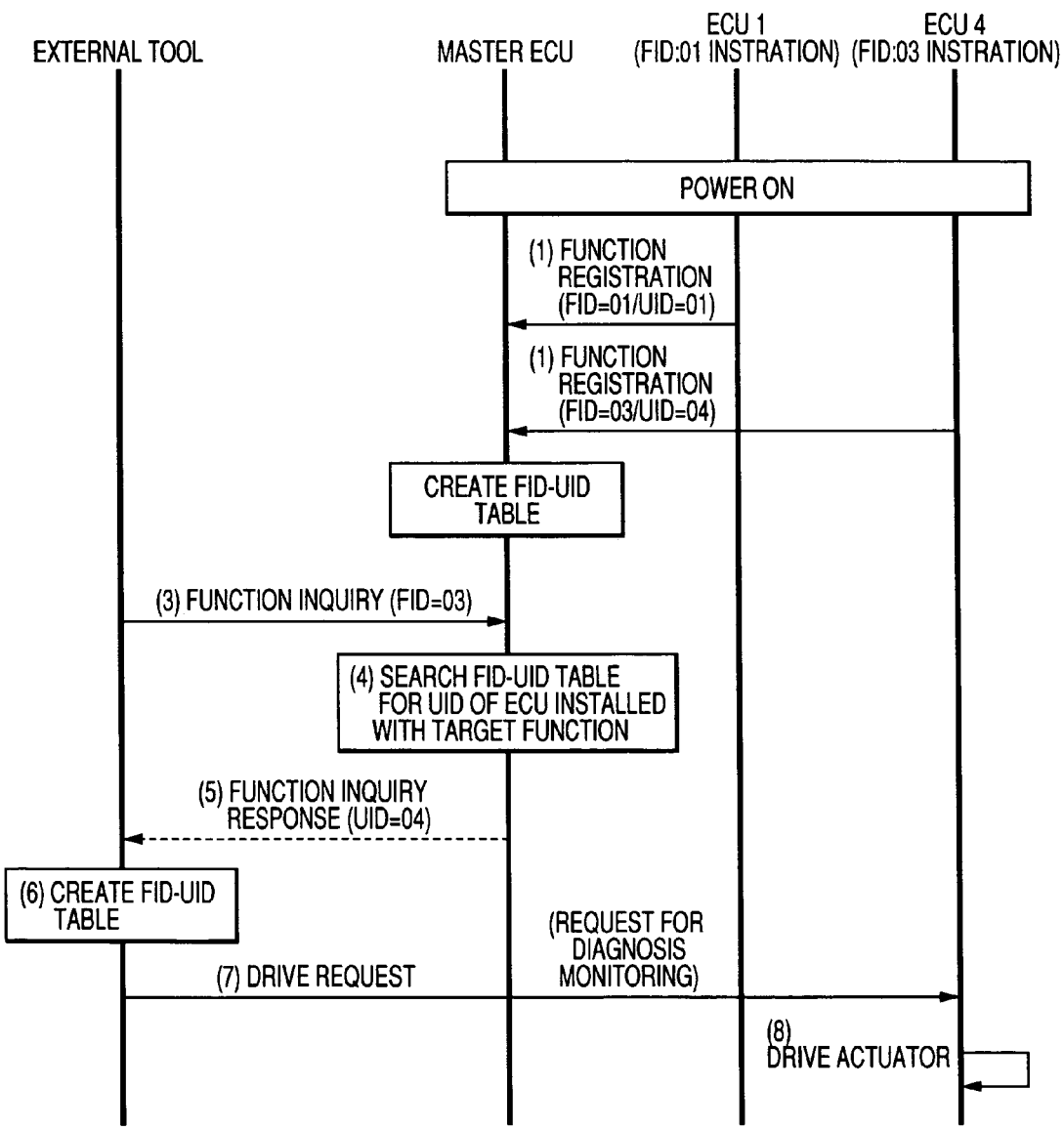
FIG. 11 is a sequence diagram schematically illustrating the sequence of actions to be executed by the external tool and each ECU and of communications sent therebetween according to a seventh embodiment of the present invention.

Next, operations of the vehicle communication system according to the seventh embodiment will be described hereinafter with reference to FIG. 11. FIG. 11 is a sequence diagram schematically illustrating the sequence of actions to be executed by the external tool 63 and each ECU and of communications sent therebetween.

When the power supply system PS starts to supply power to each of the ECUs in response to an activate signal being input thereto, each of the non-gateway ECUs 1 to 6 except for the master ECU 7 and gateway ECU 10 informs the master ECU 7 about a function registration message. The function registration message contains the own UID of each of the ECUs 1 to 6 and the FID of at least one function installed in each of the ECUs 1 to 6 (see (1) in FIG. 11). In other words, each of the non-gateway ECUs 1 to 6 informs the master ECU 7 about a function registration message containing a UID and at least one FID that should be notified to the master ECU 7.

When the power supply system starts to supply power to the ECUs, the master ECU 7 receives the function registration messages informed from the non-gateway ECUs 1 to 6, and creates an FID-UID table T illustrated in, for example, FIG. 3 based on the received function registration messages (see (2) in FIG. 11).

As well as the first and second embodiments, the FID-UID table T is designed to represent each function is installed in advance in what UID of the communicable ECUs. More simply, the FID-UID table T is designed to represent which functions are installed in advance in which communicable ECUs.

Note that, in the seventh embodiment, because the ECU 10 is designed specially for gateway, the ECU 10 is designed not to send a function registration message. If the FID of at least one function is installed in advance in the ECU 10, in other words, the ECU 10 has a function for vehicle control, the ECU 10 can be designed to send a function registration message containing its own UID and the FID of at least one function installed in advance therein.

Note that, in the seventh embodiment, the function registration messages to be sent to the master ECU 7 from the non-gateway ECUs 1 to 6 at the start of power supply include at least a header field and a data field. To the header field of the message, identification information representing that this message is a function registration message is arranged. The identification information allows the master ECU 7 to securely and simply distinguish between the function registration messages and normal communication messages.

Thereafter, while electrical connection between the communication network 50 and the external tool 63 through the connector 61 is established, an operator manipulates the keyboard or the data entry screen of the input and display unit 63e of the external tool 63 to enter an FID corresponding to at least one of the functions as a target for diagnosis monitoring.

In addition to the FID entry, the operator manipulates the keyboard or the data entry screen of the input and display unit 63e to enter descriptions that are to instruct a corresponding ECU on what the operator wants to monitor and diagnose regarding the target function.

Upon entry of the FID and the descriptions of the diagnosis monitoring, the CPU 63a of the external tool 63 creates a function inquiry message containing the FID corresponding to the target function, thereby sending it to the master ECU 7 (see (3) in FIG. 11). For example, in the seventh embodiment, the function inquiry message includes the FID (03) of the third function as the target function.

When receiving the function inquiry message, the master ECU 7 searches the FID-UID table T created by the action (2) in FIG. 11 for at least one UID of an ECU in which the FID contained in the function inquiry message is installed (see (4) in FIG. 11). When retrieving at least one UID corresponding to the FID contained in the function inquiry message from the FID-UID table T, the master ECU 7 creates a function inquiry response message containing the retrieved at least one UID, thereby sending it to the external tool 63 (see (5) in FIG. 11).

In the ninth embodiment, the function inquiry message containing the FID (03) corresponding to the third function (target function) is sent from the external tool 63 to the master ECU 7. For this reason, the function inquiry response message containing the UID (04) of the ECU 4 in which the third function is installed in advance is sent from the master ECU 7 to the external tool 63.

The CPU 63a of the external tool 63 receives the function inquiry response message sent from the master ECU 7, and creates a list of at least one UID contained in the received function inquiry response message, which is the same task as that in step S130 of FIG. 2 (see (4) in FIG. 11). Specifically, the created list recites at least one ECU in which the target function is installed.

Then, the CPU 63a of the external tool 63 executes the same tasks in step S140 and S150 in FIG. 2, and thereafter sends the request message to the ECU corresponding to at least one UID recited in the list created by the action (6) in FIG. 11 (see (7) in FIG. 11).

Note that, in the seventh embodiment, as the request message sent from the external tool 63 to the ECU 4 by the action (7) in FIG. 11, a drive request message that requests the ECU 4 to execute a function of forcibly driving an actuator that is a control target of the ECU 4 is illustrated by an example.

Specifically, upon receipt of the drive request message, the ECU 4 executes a function of forcibly driving the actuator; this function is identified by the drive request message, which causes the actuator to put in-vehicle devices into automatic action, such as force or motion (see (8) in FIG. 11). The operator therefore can monitor and diagnose the operating state of each of the in-vehicle devices to determine whether the target function (actuator driving function) is normal or abnormal based on the monitored and diagnosed result.

As described above, in the vehicle communication system according to the seventh embodiment, like the third embodiment, it is unnecessary for the external tool 63 to create and hold an FID-UID table in which the relationship between the FIDs of all of the functions and the UIDs of all of the ECUs are recorded in advance. This makes it possible to reduce the processing load required to create the FID-UID table and the storage capacity in the internal memory 63c required to store the FID-UID table.

In addition, the external tool 63 only communicates with the master ECU 7 in order to identify at least one ECU in which a target function is installed beforehand, making it possible to reduce the communication processing load of the external tool 63.

Note that, in the seventh embodiment, as a modification, the master ECU 7 can create an FID-UID table when a function inquiry message sent from the external tool 63 is received in place of when power supply is started.

Specifically, when receiving the function inquiry message sent from the external tool 63, the master ECU 7 sends, to the remaining ECUs, a function check request message inquiring, to each of the remaining ECUs which functions are installed therein.

When a function acknowledge message that contains its own UID and the FID of at least one function installed in each ECU is sent therefrom, the master ECU 7 receives the function acknowledge messages sent from the remaining ECUs, and creates an FID-UID table T illustrated in, for example, FIG. 3 based on the received function acknowledge messages.

As compared to the modification set forth above, the configuration illustrated in FIG. 11 in which the master ECU 7 is designed to create an FID-UID table when power supply is started to each ECU has an advantage. This is because of shortening a period from when the external tool 63 sends the function inquiry message until when it receives the function inquiry response message corresponding to the sent function inquiry message.

Eighth Embodiment

A vehicle communication system according to an eighth embodiment of the present invention will be described hereinafter. As compared to the structure of the vehicle communication system S according to the first embodiment, how to communicate between the external too 63 and each ECU according to the eighth embodiment is different from that according to the first embodiment.

In the eighth embodiment, the memory card 65 need not necessarily be removable from the external tool 63.

Except for the different points set forth above, the vehicle communication system of the eighth embodiment has substantially the same structure as that of the vehicle communication system of the first embodiment. For this reason, like reference characters are assigned to like parts in the vehicle communication systems according to the first and seventh embodiments so that descriptions of the parts of the vehicle communication system of the eighth embodiment will be omitted.

Figure 12:
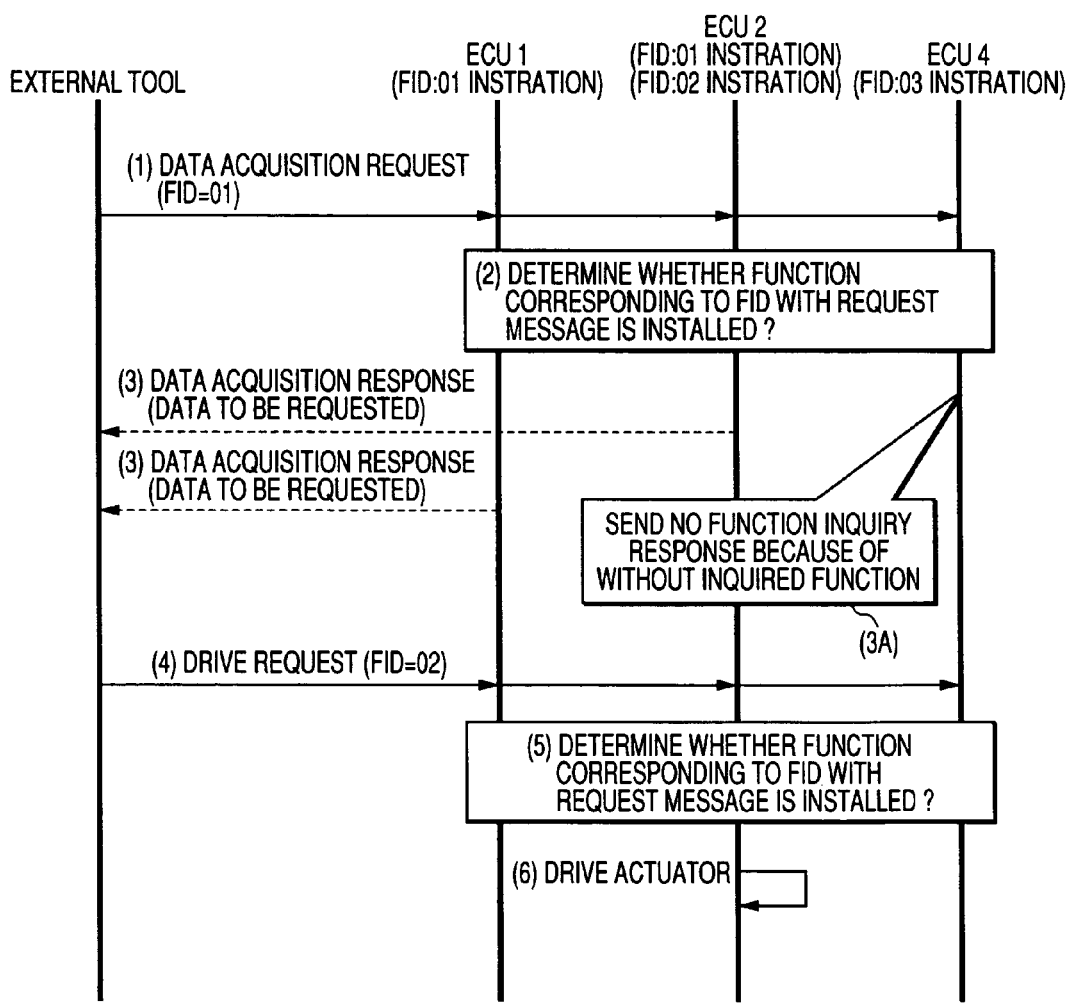
FIG. 12 is a sequence diagram schematically illustrating the sequence of actions to be executed by the external tool and each ECU and of communications sent therebetween according to an eighth embodiment of the present invention.

Next, operations of the vehicle communication system according to the eighth embodiment will be described hereinafter with reference to FIG. 12. FIG. 12 is a sequence diagram schematically illustrating the sequence of actions to be executed by the external tool 63 and each ECU and of communications sent therebetween.

While electrical connection between the communication network 50 and the external tool 63 through the connector 61 is established, an operator manipulates the keyboard or the data entry screen of the input and display unit 63e of the external tool 63 to enter an FID corresponding to at least one of the functions as a target for diagnosis monitoring.

In addition to the FID entry, the operator manipulates the keyboard or the data entry screen of the input and display unit 63e to enter descriptions that are to instruct a corresponding ECU on what the operator wants to monitor and diagnose regarding the target function.

Upon entry of the FID and the descriptions of the diagnosis monitoring, the CPU 63a of the external tool 63 creates a function inquiry message containing the FID corresponding to the target function, thereby sending it to each of the ECUs 1 to 7, and 10 (see (1) and (4) in FIG. 12). Note that, like the first embodiment, the external tool 63 can be designed to, Upon entry of the descriptions of the diagnosis monitoring, automatically determine an FID of at least one function that meets the entered descriptions.

When receiving the request message, each of the ECUs 1 to 7, and 10 determines whether the function corresponding to the FID contained in the request message is installed therein (see (2) and (5) in FIG. 12).

If it is determined that the function corresponding to the FID contained in the request message is installed therein (the determination of the action (2) or (5) is YES), an ECU executes a task indicated by the request message sent from the external tool 63 (see (3) and (6) in FIG. 12).

For example, the action (1) in FIG. 12 allows the external tool 63 to send, as the request message for diagnosis monitoring, a data acquisition request message containing the FID (01) of the first function (target function) to each of the ECUs. For this reason, as illustrated by the action (3) in FIG. 12, each of the ECUs 1 and 2 in which the first function is installed beforehand executes a data acquisition function (the target function) of:

acquiring control data that has been stored therein and specified in the descriptions of the data acquisition request message;

creating a data acquisition response message with the data field to which the acquired control data is arranged; and returning the created data acquisition response message to the external tool 63.

In addition, the action (4) in FIG. 12 allows the external tool 63 to send, as the request message for diagnosis monitoring, an actuator drive request message containing the FID (02) of the second function (target function) to each of the ECUs. For this reason, as illustrated by the action (6) in FIG. 12, the ECU 2 in which the second function is installed beforehand executes a function (target function) of forcibly driving the actuator indicated by the actuator drive request message.

As described above, according to the eighth embodiment, like each of the first to seventh embodiment, even if an operator to perform diagnosis monitoring of the target vehicle has no grasp where the target function is installed in the ECUs, it is possible for the operator to perform diagnosis monitoring of the target function.

In the sixth to sixth embodiments illustrated in FIGS. 6 to 10, the communication network 50A can have a four or more level hierarchical structure.

In each of the first to eighth embodiments, the connector 61 can establish electrical connection between the external tool 63 and the communication network 50, 50A in a vehicle, but the present invention is not limited to the structure. Specifically, the external tool 63 and the communication network 50, 50A can establish wireless connection therebetween.

Specifically, a vehicle communication system further includes a radio communication control device that allows radio communication between the external tool 63 and each of the ECUs linked to the communication network 50, 50A. The radio communication control device need not be provided as a hardware device. Specifically, a software module causing at least one ECU (gateway ECU or non-gateway ECU) to establish radio communications between the external tool 63 and each of the ECUs can be installed in the at least one ECU.

In each of the first to eighth embodiments, the first functions (FID=01) installed in both the ECUs 1 and 2 (UIDs=01 and 02) can be identical to each other. On the other hand, the first functions (FID=01) distributedly installed in both the ECUs 1 and 2 (UIDs=01 and 02) can be designed to be collaborated with each other as a single function module. This allows the ECU 1 and/or 2 to execute the first functions, thereby actualizing execution of at least one task, such as an operation of a specific control variable associated with vehicle control.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A vehicle communication system in which a plurality of control units are communicably linked to a communication network, and a monitoring device is designed to be communicably linkable to the communication network and to establish communications with at least one of the plurality of control units for monitoring, the vehicle communication system comprising:

a first identifier uniquely assigned to at least one function for vehicle control, the at least one function being installed in at least one of the plurality of control units; and an identifying unit configured to identify that a target function uniquely assigned with a target identifier is installed in one of the control units based on the first identifier and the target identifier, wherein the at least one function includes a plurality of functions to each of which the first identifier is assigned, the plurality of functions being installed in at least one of the plurality of control units, and the identifying unit further comprises:

a table representing that each of the plurality of functions is installed in one of the control units using the first identifier of each of the plurality of functions; and an identifying module configured to search the table for the target function based on the target identifier and to identify that the target function is installed in one of the control units based on the searched result.

2. A vehicle communication system according to claim 1, wherein the identifying module is installed in the monitoring device, and the monitoring device further includes a memory unit removable thereto such that the table is stored in the memory unit, the identifying module reading the table from the memory unit and searching the table for the target function.

3. A vehicle communication system in which a plurality of control units are communicably linked to a communication network, and a monitoring device is designed to be communicably linkable to the communication network and to establish communications with at least one of the plurality of control units for monitoring the vehicle communication system comprising:
- a first identifier uniquely assigned to at least one function for vehicle control, the at least one function being installed in at least one of the plurality of control units; and
- an identifying unit configured to identify that a target function uniquely assigned with a target identifier is installed in one of the control units based on the first identifier and the target identifier,
- wherein the at least one function includes a plurality of functions to each of which the first identifier is assigned, the plurality of functions being installed in at least one of the plurality of control units, and the identifying unit further comprises:
- a first sending module provided in the monitoring device and configured to send a function check request message to each of the control units;
- a second sending module provided in each of the control units and configured to send a function acknowledge message to the monitoring device upon receiving of the function check request message, the function acknowledge message containing the first identifier of at least one of the functions installed in each of the control units and a second identifier uniquely assigned with each of the control units;
- a table creating module provided in the monitoring device and configured to create a table representing that each of the plurality of functions is installed in one of the control units based on the first identifier and the second identifier contained in the function acknowledge message sent from each of the control units; and
- an identifying module provided in the monitoring device and configured to search the created table for the target function and to identify that the target function is installed in one of the control units based on the searched result.

4. A vehicle communication system according to claim 3, wherein the identifying unit further comprises a broadcasting module provided in the monitoring unit and configured to broadcast a communication check request message to each of the control units before the first sending module sends the function check request message, the communication check request message causing each of the control units to send a response to the monitoring device, the first sending module being configured to:
- determine whether to receive the response from each of the control units within a predetermined period; and
- send the function check request message to at least one of the control units in place of each of the control units when it is determined that the response from the at least one of the control units is received within the predetermined period after broadcasting the communication check request message by the broadcasting module.

5. A vehicle communication system in which a plurality of control units are communicably linked to a communication network, and a monitoring device is designed to be communicably linkable to the communication network and to establish communications with at least one of the plurality of control units for monitoring, the vehicle communication system comprising:
- a first identifier uniquely assigned to at least one function for vehicle control, the at least one function being installed in at least one of the plurality of control units; and
- an identifying unit configured to identify that a target function uniquely assigned with a target identifier is installed in one of the control units based on the first identifier and the target identifier,
- wherein the at least one function includes a plurality of functions to each of which the first identifier is assigned, the plurality of functions being installed in at least one of the plurality of control units, and the identifying unit further comprises:
- a first sending module provided in the monitoring unit and configured to send a function inquiry request message to each of the control units, the function inquiry request message containing the first identifier of the target function;
- a determining module provided in each of the control units and configured to determine whether the target function is installed in each of the control units upon receiving of the function inquiry request message;
- a second sending module provided in at least one of the control units and configured to send a function inquiry response message when it is determined the target function is installed in the at least one of the control units, the function inquiry response message containing a second identifier uniquely assigned with the at least one of the control units; and
- an identifying module provided in the monitoring device and configured to identify that the target function is installed in the at least one of the control units based on the second identifier contained in the function inquiry response message.

6. A vehicle communication system according to claim 5, wherein the communication network includes:
- a first communication bus to which the monitoring device is communicably linkable; and
- a second communication bus lower in level than the first communication bus and linkable to the first communication bus via a gateway unit, one of the control units serving as the gateway unit operative to interconnect the first and second communication buses, and the gateway unit is configured to:
- communicate with at least one of the control units linked to the second communication bus to obtain identification information representing the first identifier of at least one of the functions installed in the at least one of the control units;
- create a list in which the obtained identification information has been recorded; and
- upon receiving of the function inquiry request message, relay the function inquiry request message to the at least one of the control units only when the first identifier contained in the function inquiry request message is recorded in the created list.

7. A vehicle communication system according to claim 6, wherein the gateway unit is configured to execute, immediately after start of power supply to each of the control units, the communication with the at least one of the control units linked to the second communication bus to obtain the identification information.

8. A vehicle communication system according to claim 5, wherein the communication network includes:
- a first communication bus to which the monitoring device is communicably linkable;

a second communication bus lower in level than the first communication bus and linkable to the first communication bus via a first gateway unit, one of the control units serving as the first gateway unit operative to interconnect the first and second communication buses; and
a third communication bus lower in level than the second communication bus and linkable to the second communication bus via a second gateway unit, another one of the control units serving as the second gateway unit operative to interconnect the second and third communication buses,
at least one of the control units linked to the third communication bus is configured, in response to start of power supply thereto, to inform the second gateway unit about first identification information representing the first identifier of at least one of the functions installed in the at least one of the control units,
at least another one of the control units linked to the second communication bus is configured, in response to start of power supply thereto, to inform the first gateway unit about second identification information representing that the first identifier of at least one of the functions installed in the at least another one of the control units,
the second gateway unit is configured, in response to start of power supply thereto, to:
receive the first identification information sent from the at least one of the control units linked to the third communication bus;
create a list in which the obtained first identification information has been recorded; and
inform the first gateway unit about information including the first identification information recorded by the list and the first identifier of at least one of the functions installed in the second gateway unit, and
the first gateway unit is configured, in response to start of power supply to each of the control units, to:
receive the second identification information sent from the at least another one of the control units and the information sent from the second gateway unit; and
create a list in which the obtained second identification information and the information sent from the second gateway unit has been recorded.

9. A vehicle communication system according to claim 7, wherein the power supply is started in response to turning on of a vehicle ignition switch.

10. A vehicle communication system according to claim 7, wherein the power supply is started in response to turning on of a vehicle key switch at timing of insertion of a vehicle ignition key into a vehicle key cylinder.

11. A vehicle communication system according to claim 6, wherein the gateway unit is configured to send a message to the at least one of the control units linked to the second communication bus to obtain the identification information, and the message contains a header field to which identification information is arranged, the identification information representing that the corresponding message is a communication message used to create the list.

12. A vehicle communication system according to claim 5, wherein the communication network includes:
a first communication bus to which the monitoring device is communicably linkable; and
a second communication bus lower in level than the first communication bus and linkable to the first communication bus via a gateway unit, one of the control units serving as the first gateway unit operative to interconnect the first and second communication buses, and the gateway unit is configured to:
communicate with at least one of the control units linked to the second communication bus to obtain identification information representing the first identifier of at least one of the functions installed in the at least one of the control units and the second identifier of the at least one of the control units;
create a table in which the first identifier and the second identifier contained in the obtained identification information are recorded to be associated to each other, when at least one function is installed in the gateway unit, the first identifier of the at least one function installed in the gateway unit and the second identifier of the gateway unit being recorded to be associated with each other in the table;
upon receiving of the function inquiry request message, determine whether the first identifier contained in the function inquiry request message is recorded in the created table; and
send a function inquiry response message to the monitoring unit when it is determined that the first identifier contained in the function inquiry request message is recorded in the created table, the function inquiry response message containing the second identifier corresponding to the first identifier contained in the function inquiry request message.

13. A vehicle communication system according to claim 12, wherein the gateway unit is configured to execute, immediately after start of power supply to each of the control units, the communication with the at least one of the control units linked to the second communication bus to obtain the identification information.

14. A vehicle communication system according to claim 5, wherein the communication network includes:
a first communication bus to which the monitoring device is communicably linkable;
a second communication bus lower in level than the first communication bus and linkable to the first communication bus via a first gateway unit, one of the control units serving as the first gateway unit operative to interconnect the first and second communication buses; and
a third communication bus lower in level than the second communication bus and likable to the second communication bus via a second gateway unit, another one of the control units serving as the second gateway unit operative to interconnect the second and third communication buses,
at least one of the control units linked to the third communication bus is configured, in response to start of power supply thereto, to inform the second gateway unit about identification information representing that the first identifier of at least one of the functions installed in the at least one of the control units and the second identifier of the at least one of the control units,
at least another one of the control units linked to the second communication bus is configured, in response to start of power supply thereto, to inform the first gateway unit about second identification information representing the first identifier of at least one of the functions installed in another at least one of the control units and the second identifier of another at least one of the control units,
the second gateway unit is configured, in response to start of power supply thereto, to:
receive the first identification information sent from the at least one of the control units linked to the third communication bus;
create a first table in which the first identifier and the second identifier contained in the obtained identification information are recorded to be associated to each other, when at least one function is installed in the second gateway unit, the first identifier of the at least one function installed in the second gateway unit and the second identifier of the second gateway unit being recorded to be associated with each other in the first table; and inform the first gateway unit about table creating information including information representing the created first table, and the first gateway unit is configured, in response to start of power supply to each of the control units, to:

receive the second identification information sent from the at least another one of the control units and the table creating information sent from the second gateway unit;

create a second table in which the first identifier and the second identifier contained in the table creating information are recorded to be associated to each other, when at least one function is installed in the first gateway unit, the first identifier of the at least one function installed in the first gateway unit and the second identifier of the first gateway unit being recorded to be associated with each other in the second table;

upon receiving of the function inquiry request message, determine whether the first identifier contained in the function inquiry request message is recorded in the created second table; and send a function inquiry response message to the monitoring unit when it is determined that the first identifier contained in the function inquiry request message is recorded in the created second table, the function inquiry response message containing the second identifier corresponding to the first identifier contained in the function inquiry request message.

15. A vehicle communication system according to claim 13, wherein the power supply is started in response to turning on of a vehicle ignition switch.

16. A vehicle communication system according to claim 13, wherein the power supply is started in response to turning on of a vehicle key switch at timing of insertion of a vehicle ignition key into a vehicle key cylinder.

17. A vehicle communication system according to claim 12, wherein the gateway unit is configured to send a message to the at least one of the control units linked to the second communication bus to obtain the identification information, and the message contains a header field to which identification information is arranged, the identification information representing that the corresponding message is a communication message used to create the table.

18. A vehicle communication system according to claim 12, wherein the first sending module is configured to send the function inquiry request message to one of the control units linked to the first communication bus in place of each of the control units, and the one the control units is configured to:

send the function inquiry message to the remaining control units;

receive the function inquiry response message sent from the at least one of the control units when it is determined the target function is installed in the at least one of the control units, the function inquiry response message containing a second identifier uniquely assigned with the at least one of the control units; and send the received function inquiry response message to the monitoring device.

19. A vehicle communication system in which a plurality of control units are communicably linked to a communication network, and a monitoring device is designed to be communicably linkable to the communication network and to establish communications with at least one of the plurality of control units for monitoring, the vehicle communication system comprising:

a first identifier uniquely assigned to at least one function for vehicle control, the at least one function being installed in at least one of the plurality of control units; and an identifying unit configured to identify that a target function uniquely assigned with a target identifier is installed in one of the control units based on the first identifier and the target identifier, wherein the at least one function includes a plurality of functions to each of which the first identifier is assigned, the plurality of functions being installed in at least one of the plurality of control units, and the identifying unit further comprises:

a table provided in one of the control units and representing that each of the plurality of functions is installed in one of the control units using the first identifier of each of the plurality of functions;

a first sending module provided in the monitoring unit and configured to send a function inquiry request message to the one of the control units, the function inquiry request message containing the first identifier of the target function;

a searching module provided in the one of the control units and configured to search the table for at least one of the control units corresponding to the target function contained in the function inquiry request message;

a second sending module provided in the one of the control units and configured to send, to the monitoring unit, a function inquiry response message containing a second identifier uniquely assigned to the at least one of the control units; and an identifying module provided in the monitoring device and configured to identify that the target function is installed in the at least one of the control units whose second identifier is contained in the function inquiry response message.

20. A vehicle communication system according to claim 19, wherein each of the control units except for the one of the control units is configured, in response to start of power supply thereto, to inform the one of the control units about the first identifier of at least one of the function installed therein and the second identifier of each of the control units except for the one of the control units, and the one of the control units is configured, in response to start of power supply thereto, to create the table based on the first identifier of at least one of the functions installed in each of the control units except for the one of the control units.

21. A vehicle communication system according to claim 20, wherein the power supply is started in response to turning on of a vehicle ignition switch.

22. A vehicle communication system according to claim 20, wherein the power supply is started in response to turning on of a vehicle key switch at timing of insertion of a vehicle ignition key into a vehicle key cylinder.

23. A vehicle communication system according to claim 20, wherein each of the control units except for the one of the control units is configured to send a message to the one of the control units, and the message contains a header field to which identification information is arranged, the identification information representing that the corresponding message is a communication message used to create the table.

24. A vehicle communication system in which a plurality of control units are communicably linked to a communication network, and a monitoring device is designed to be communicably linkable to the communication network and to establish communications with at least one of the plurality of control units for monitoring, the vehicle communication system comprising:

- a first identifier uniquely assigned to at least one function for vehicle control, the at least one function being installed in at least one of the plurality of control units; and
- an identifying unit configured to identify that a target function uniquely assigned with a target identifier is installed in one of the control units based on the first identifier and the target identifier,
- wherein the at least one function includes a plurality of functions to each of which the first identifier is assigned, the plurality of functions being installed in at least one of the plurality of control units, and the identifying unit further comprises:
- a sending unit provided in the monitoring device and configured to send a request message to each of the control units, the request message containing the first identifier of the target function and descriptions used to monitor the target function; and
- a determining unit provided in each of the control units and configured to:
  - receive the request message;
  - determine whether the target function whose first identifier is contained in the request message is installed therein; and
  - execute the target function based on the descriptions corresponding thereto when it is determined that the target function whose first identifier is contained in the request message is installed therein.

* * * * *